Jan. 12, 1971    R. P. STEIN ET AL    3,555,015
PROCESS FOR THE PREPARATION OF GONA-1,3,5(10),7-TETRAENES
Filed Sept. 17, 1968    2 Sheets-Sheet 1

INVENTORS
REINHARDT P. STEIN
GEORGE C. BUZBY, JR.
HERCHEL SMITH
BY Vito Victor Bellino
ATTORNEY

United States Patent Office  3,555,015
Patented Jan. 12, 1971

3,555,015
PROCESS FOR THE PREPARATION OF
GONA-1,3,5(10),7-TETRAENES
Reinhardt P. Stein, Conshohocken, George C. Buzey, Jr., Philadelphia, and Herchel Smith, Wayne, Pa., assignors to American Home Products Corporation, New York, N.Y., a corporation of Delaware
Continuation-in-part of applications Ser. No. 559,175, June 21, 1966, and Ser. No. 646,961, June 19, 1967.
This application Sept. 17, 1968, Ser. No. 760,212
Int. Cl. C07c 173/00
U.S. Cl. 260—239.55                              25 Claims

ABSTRACT OF THE DISCLOSURE

Treatment of a 13-alkylgona-1,3,5(10),8-tetraene with organic peracid results in the formation of a corresponding 8,9-epoxy-13-alkylgona-1,3,5(10)-triene, which upon treatment with acid, is ring-opened and rearranged to the corresponding 13-alkylgona-1,3,5(10),9(11)-tetraen-8-ol. Catalytic hydrogenation then affords the corresponding 13-alkylgona-1,3,5(10)-trien-8-ol which upon dehydration gives the corresponding 13-alkylgona-1,3,5(10),7-tetraene. There is thus provided a route to the synthesis of equilin and related compounds.

CROSS-REFERENCE TO RELATED APPLICATIONS

This application is a continuation-in-part of U.S. applications Ser. No. 559,175, filed June 21, 1966, and Ser. No. 646,961, filed June 19, 1967, both applications now abandoned.

BACKGROUND OF THE INVENTION

This invention relates to compositions of matter classified in the art of chemistry as 13-alkylgona-1,3,5(10),7-tetraene derivatives, to intermediates therefor; and to processes for making and using such compositions. Prior to applicants' invention, some gona-1,3,5(10),7-tetraenes which contained a methyl group at position 13 were known in the art, but none in which the 13-substituent was polycarbonalkyl.

SUMMARY OF THE INVENTION

The invention sought to be patented in a principal composition aspect resides in the concept of a 13-alkyl-8,9-epoxygona-1,3,5(10)-triene in which there is attached at the 3-position an alkoxy, cycloalkoxy, acyloxy or hydroxy group.

The tangible embodiments of the principal composition aspect of the invention possess the inherent general physical properties of being white crystalline solids, are substantially insoluble in water, and are generally soluble in polar solvents, such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the epoxide of the substituted styrenoid-type is evident in the ultraviolet spectrum. The aforementioned physical characteristics taken together with the nature of the starting materials, the elemental analysis and the products obtained therefrom, further confirm the molecular structure hereinbefore set forth.

The tangible embodiments of the principal composition aspect of the invention possess the applied use characteristic of being intermediates for making compositions which possess the inherent applied use characteristic of exerting qualitatively varying hormonal effects in animals as evidenced by pharmacological evaluation according to standard test procedures, more specifically compounds having lipid-lowering and estrogenic effects. Furthermore, the tangible embodiments of the principal compositions of the invention possess the applied use characteristic of exerting lipid-lowering estrogenic effects in animals as evidenced by pharmacological evaluation according to standard test procedures.

The invention sought to be patented in a second composition aspect of the invention resides in the concept of a 13-alkyl-8-hydroxygona-1,3,5(10),9(11)-tetraene in which there is attached at the 3-position an alkoxy, cycloalkoxy, acyloxy or hydroxy group.

The tangible embodiments of the second composition aspect of the invention possess the inherent general physical properties of being white crystalline solids, are substantially insoluble in water, and are generally soluble in polar solvents, such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the conjugate unsaturation is evident in the ultraviolet and the vinyl proton at Carbon 11 is evident in the nuclear magnetic resonance spectrum. The aforementioned physical characteristics taken together with the nature of the starting materials, the elemental analysis and the product obtained therefrom, further confirm the molecular structure hereinbefore set forth.

The tangible embodiments of the second composition aspect of the invention possess the applied use characteristic of being intermediates for making compositions which possess the inherent applied use characteristic of exerting qualitatively varying hormonal effects in animals as evidenced by pharmacological evaluation according to standard test procedures, more specifically compounds having lipid-lowering and estrogenic effects. Furthermore the tangible embodiments of the principal compositions of the invention possess the applied use characteristic of exerting lipid-lowering and estrogenic effects in animals as evidenced by pharmacological evaluation according to standard test procedures.

The invention sought to be patented in a third composition aspect of the invention resides in the concept of a 13-alkyl-8-hydroxygona-1,3,5(10)-triene in which there is attached at the 3-position an alkoxy, cycloalkoxy, acyloxy or hydroxy group.

The tangible embodiments of the third composition aspect of the invention possess the inherent general physical properties of being white crystalline solids, are substantially insoluble in water, and are generally soluble in polar solvents, such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the conjugate unsaturation evident in the ultraviolet spectrum of the compound from which it is prepared and the vinyl proton evident in the nuclear magnetic resonance spectrum of the compound from which it has been prepared are no longer present. The aforementioned physical characteristics taken together with the nature of the starting materials, the elemental analysis, and the product obtained therefrom, further confirm the molecular structure hereinbefore set forth.

The tangible embodiments of the third composition aspect of the invention possess the applied use characteristic of being intermediates for making compositions which possess the inherent applied use characteristic of exerting qualitatively varying hormonal effects in animals as evidenced by pharmacological evaluation according to standard test procedures, more specifically compounds having lipid-lowering and estrogenic effects. Furthermore, the tangible embodiments of the third compositions of the invention possess the applied use characteristic of exerting lipid-lowering and estrogenic effects in animals as evidenced by pharmacological evaluation according to standard test procedures.

The invention sought to be patented in a fourth composition aspect of the invention resides in the concept of a 13-polycarbonalkylgona-1,3,5(10),7-tetraene in which there is attached at the 3-position an alkoxy, cycloalkoxy, acyloxy or hydroxy group.

The tangible embodiments of the fourth composition aspect of the invention possess the inherent general physical properties of being white crystalline solids, are substantially insoluble in water, and are generally soluble in polar solvents, such as dimethylacetamide. Examination of the compounds produced according to the hereinafter described process reveals, upon infrared and nuclear magnetic resonance spectrographic analysis, spectral data supporting the molecular structure hereinbefore set forth. For example, the vinyl proton at Carbon 7 is evident in the nuclear magnetic resonance spectrum. The aforementioned physical characteristics taken together with the nature of the starting materials and the elemental analysis further confirm the molecular structure hereinbefore set forth.

The tangible embodiments of the fourth composition aspect of the invention possess the inherent applied use characteristic of exerting qualitatively varying hormonal effects in animals as evidenced by pharmacological evaluation according to standard test procedures, more specifically estrogenic and lipid-lowering effects. Furthermore, the tangible embodiments of the fourth composition aspect of the invention possess the applied use characteristic of being intermediates for making other compositions which possess the inherent applied use characteristic of exerting qualitatively varying hormonal effects in animals as evidenced by pharmacological evaluation according to standard test procedures, more specifically compounds having lipid-lowering and estrogenic effects.

The invention sought to be patented in a principal process aspect resides in the concept of a sequence of reactions including:

(a) converting a 13-alkylgona-1,3,5(10),8-tetraene to the corresponding 8,9-epoxygona-1,3,5(10)-triene,
(b) opening the epoxide ring to form an 8-hydroxy-1,3,5 (10),9(11)-tetraene.
(c) selectively catalytically hydrogenating the 9,11-unsaturation, and
(d) dehydrating across the 7,8-positions to obtain a 13-alkylgona-1,3,5(10),7-tetraene.

The invention sought to be patented in a second process aspect resides in the concept of opening the epoxide ring of a 13-alkyl-8,9-epoxygona-1,3,5(10)-triene to form the corresponding 8-hydroxy-1,3,5(10),9(11)-tetraene.

The invention sought to be patented in a third process aspect resides in the concept of dehydrating a 13-alkyl-8-hydroxygona-1,3,5(10)-triene to form a 13-alkylgona-1,3,5(10),-7-tetraene.

BRIEF DESCRIPTION OF THE DRAWINGS

In describing the invention reference will be made in the following specification to the annexed drawings, wherein.

DESCRIPTION OF THE PREFERRED EMBODIMENTS

Figure 1:
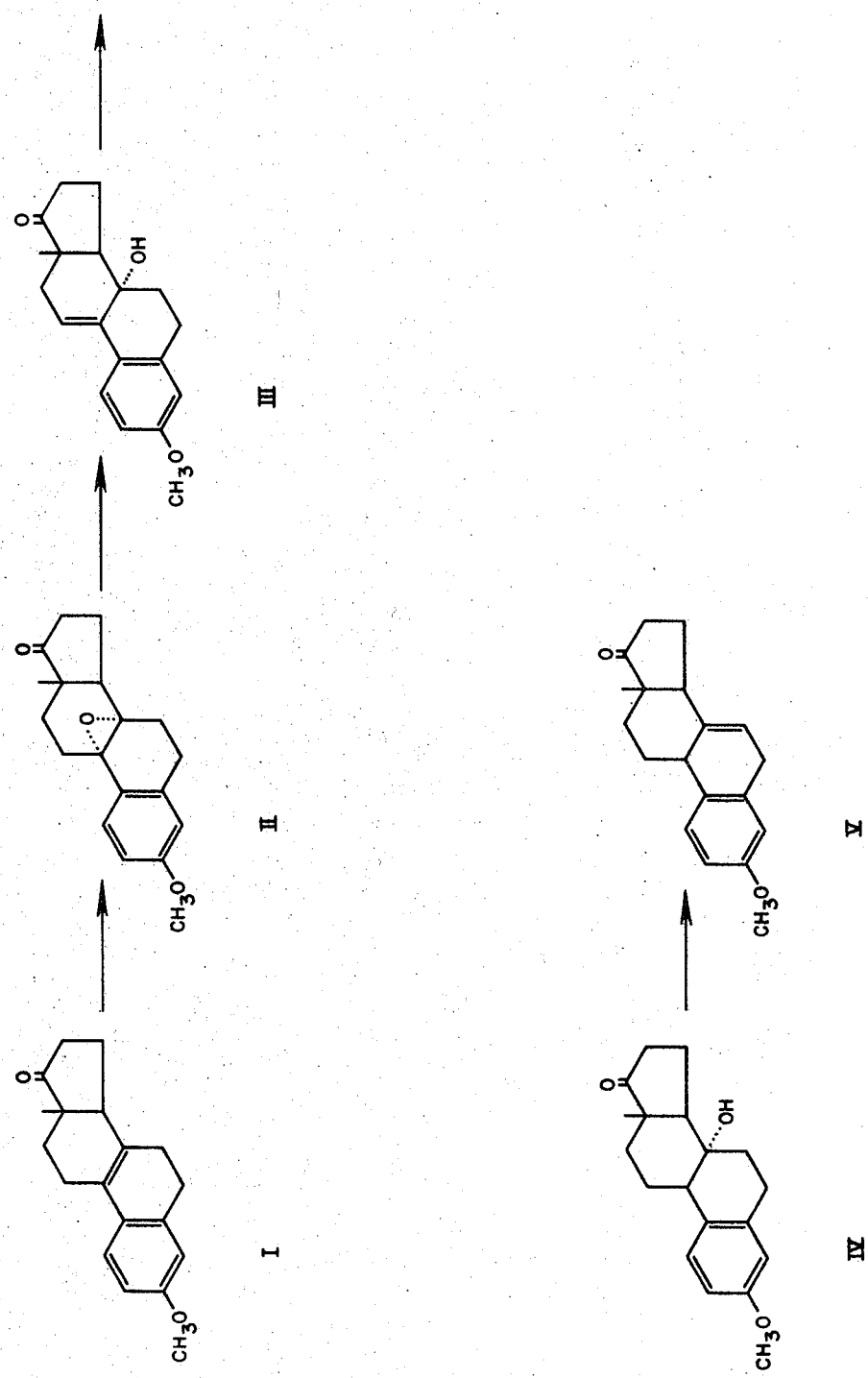
FIG. 1 illustrates schematically the reaction sequence for preparing a 13-alkylgona-1,3,5(10),7-tetraene, specifically 13 - methyl-3-methoxygona-1,3,5(10),7-tetraene-17-one.

Referring now to FIG. 1 wherein the compounds are assigned Roman numerals for identification, the starting materials for the process of the invention, i.e., the 13-alkylgona-1,3,5(10),8-tetraenes (I) may be prepared as described in British Pats. Ser. No. 991,594 and Ser. No. 1,024,911, or from compounds whose preparation from the compounds therein described would be obvious to one skilled in the art of organic chemistry. Said starting 13-alkylgona-1,3,5(10),8-tetraenes are treated at low temperature with preferably one mole of an organic percarboxylic acid such as, for example, m-chloroperbenzoic acid at 0° C., in a solvent of moderate polarity (e.g., benzene chloroform, methylene chloride) preferably benzene-hexane containing an inorganic base such as potassium carbonate, to prepare the corresponding $8\alpha,9\alpha$-epoxygona-1,3,5(10)-triene (II). Stirring of the epoxide with an organic carboxylic acid such as, for example, but not limited thereto, benzoic acid in a solvent of moderate polarity (e.g., as above, i.e., benzene, chloroform, methylene chloride) preferably chloroform, opens the epoxide ring to give the corresponding 13-alkyl-$8\alpha$-hydroxygona-1,3,5(10),9(11)-tetraene (III). The strength of acid necessary to perform the epoxide ring-opening is dependent upon the electron-donating ability of the A-ring substituent. Thus, where the epoxygonane has a 3-methoxy or 3-hydroxy group, an acid as weak as benzoic acid is sufficiently strong. However, where there is a 3-acetoxy group present, an acid as strong as 2,4-dinitrobenzoic acid is necessary to accomplish almost complete conversion of the epoxygonatriene to the $8\alpha$-hydroxygona-tetraene; acids intermediate in strength between benzoic and 2,4-dinitrobenzoic (e.g., m-chlorobenzoic, furoic and 2-chloro-5-nitrobenzoic) accomplish the conversion in a degree relative to their acid strength. In any case, the particular acid strength necessary to cause the desired ring-opening and rearrangement may be readily determined by one skilled in the art of steroid chemistry from a consideration of the electron-donating ability of the A-ring substituent. It should be noted that very strong acids, such as mineral acids, should be avoided since they will cause dehydration resulting in simultaneous formation of equilenins and gona-1,3,5(10),8,14-pentaenes.

Upon selective catalytic hydrogenation of the 9(11)-unsaturation of III by methods known to those skilled in the art of organic chemistry, there is obtained the 13-alkyl-$8\alpha$-hydroxy-gona-1,3,5(10)-triene (IV). Treating the 8-hydroxy-1,3,5(10)-triene with an acid halide in a non-acidic solvent gives the corresponding 13-alkylgona-1,3,5(10),7-tetraene (V). Thus, for example, one may use an acyl halide in an alcohol, such as acetyl chloride in refluxing methanol, or an alkyl sulfonyl halide in an organic base, preferably methane sulfonyl chloride in hot pyridine, or an inorganic acid halide at even room temperature or below, preferably phosphorous oxychloride in dimethyl formamide. When an hydroxyl group elsewhere in the molecule is converted to a mesyl ester grouping by such treatment, said ester grouping can be converted back to an hydroxy grouping by methods known to those skilled in the art. If the system dimethylformamide-pyridine-methane sulfonyl chloride or inorganic acid halide-dimethylformamide is used for the dehydration of IV to give V, an hydroxyl elsewhere in the molecule is converted to a formyloxy group, which can also be converted back to hydroxyl by methods known to those skilled in the art. During the dehydration reaction, a tertiary hydroxyl group elsewhere in the molecule can undergo concomitant elimination giving the corresponding gona-1,3,5(10), 7-tetraene having an additional olefinic bond.

While the process has been specifically described by reference to the drawing which illustrates the application of the process of our invention to a compound having a 17-keto group, it will be apparent to those skilled in the art of organic chemistry that other groups may be substituted at that position. Thus in lieu of a keto group, the 17-carbon may bear an hydroxy group, an alkyl and an hydroxy group, an alkynyl and an hydroxy group, an acyloxy group, a ketal group, or other group which does not interfere in the processes of the invention, and those groups are the full equivalents of the compounds specifically disclosed and claimed in the processes of the invention and as intermediates for making compounds having useful hormonal activities. Furthermore, the 17-carbonyl group when present in any of the intermediate or product aspects of the invention, can be converted to alkyl hydroxymethylene, for example, the 17α-methyl-17β-hydroxy or 17α-ethyl-17β-hydroxy derivative by addition of the appropriate organo-metallic compounds, or to alkynyl hydroxymethylene, for example, the 17α-ethynyl-17β-hydroxy derivative, including haloalkynyl hydroxymethylene, for example, the 17α-chloroethynyl-17β-hydroxy derivative, by addition of the appropriate alkali metal acetylide, to alkenylhydroxymethylene, for example, the 17α-allyl-17β-hydroxy derivative by reduction of the corresponding 17α-alkynyl-17β-hydroxy compound; the 17-carbonyl can be ketalized, thio-ketalized, or it can be reduced to a 17-hydroxy group, and the latter esterified, all by methods known to those skilled in the art. Further, while the process has been specifically described by reference to the drawing which illustrates the application of the processes of our invention to a compound having a 3-methoxy group, it will be apparent from this disclosure to those skilled in the art of steroid chemistry that other groups may be substituted at that position. Thus, in lieu of a methoxy group, the 3-position may bear a cyclopentyloxy, an acetoxy or a hydroxy group, or any other substituent provided the substituent is neither so deactivating (with reference to electrophilic aromatic substitution) that it would prevent the epoxide-ring opening from taking place, nor interferes with the course of the reactions; compounds bearing such groups are the full equivalents of the compounds specifically disclosed and claimed, in the processes of the invention, and as intermediates for making compounds having useful hormonal activities. Further, it will be apparent to those skilled in the art of steroid chemistry, that for the processes of the invention it is not necessary that there be any substitution at the 3-position, and still further, it will be apparent that other positions on the A-ring may bear a substituent, subject to the same limitations which were discussed for 3-position substituents. For the processes of this invention such variaitons are the full equivalents of those specifically disclosed and claimed.

Figure 2:
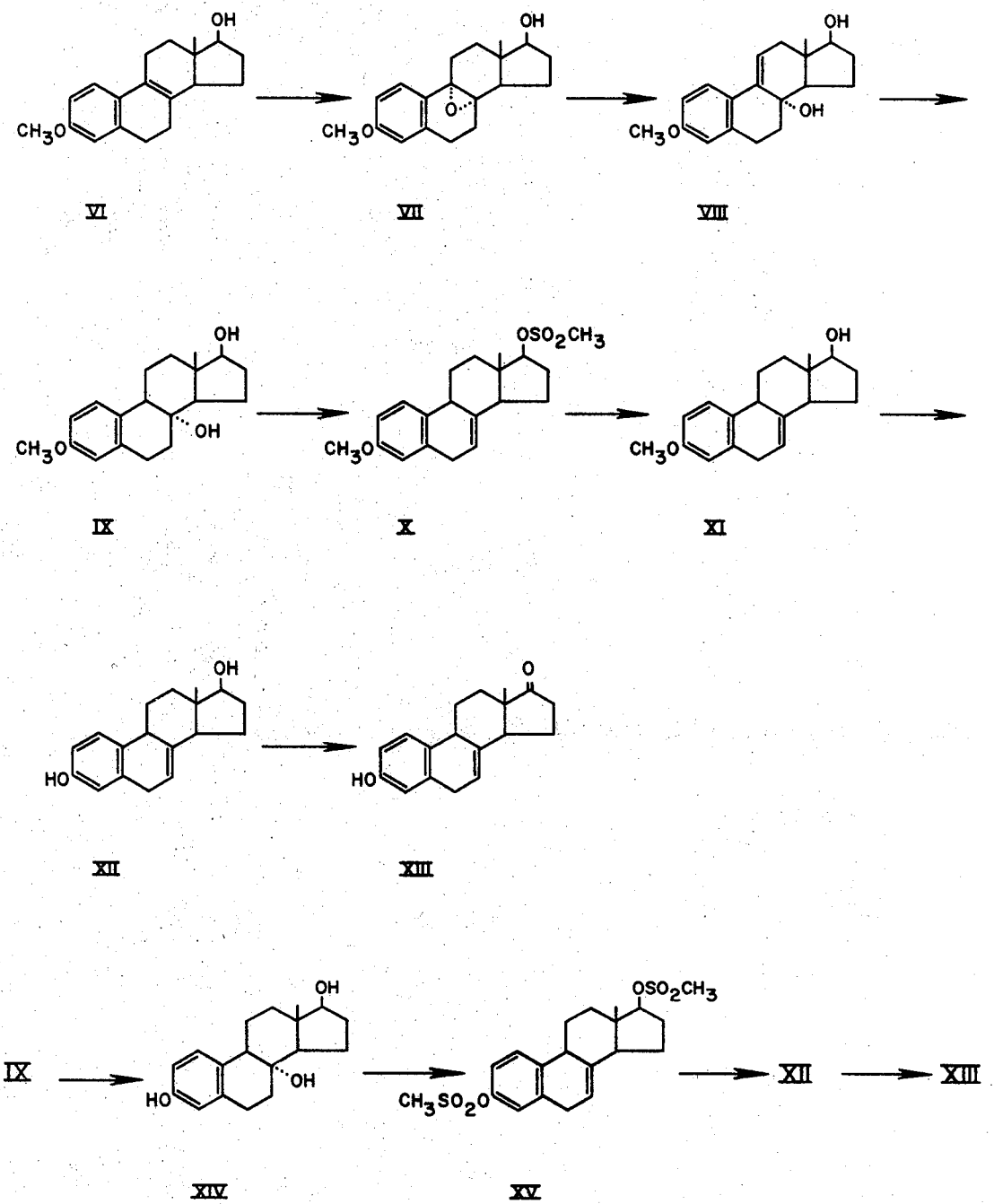
FIG. 2 illustrates schematically reaction sequences for preparing 3 - hydroxyestra - 1,3,5(10),7 - tetraen-17-one (equilin) from 3-methoxyestra-1,3,5(10),8-tetraen-17-ol.

The hereinbefore described processes describe a novel, unique, and feasible synthetic route to the corresponding natural sex hormone equilin when the 13-alkyl group is methyl. Referring now to FIG. 2, for the processes to be so used the estratetraenol (VI) is converted by the processes of the invention as hereinbefore described through the intermediates VII, VIII, and IX to the mesylate (X). This ester is cleaved by reduction with lithium aluminum hydride and the resulting alcohol (XI) is converted by heating with a methyl magnesium halide at a temperature above 100° to the estratetrene diol (XII) which is oxidized under Oppenauer conditions to equilin (XIII). Alternatively, the diol (IX) is demethylated by heating with a methylmagnesium halide as before, the resulting triol (XIV) is converted by heating with methane sulfonyl chloride in pyridine to the estratetraene (XV), and the latter is cleaved by lithium aluminum hydride reduction to the diol (XII), which is oxidized as before to equilin. In a variant of this alternate route the triol (XIV) is converted to a 3,17-diacylate (e.g., 3,17-diformate or diacetate) which is eliminated to the corresponding estratetraene 3,17-diacylate and converted by ester hydrolysis and Oppenauer oxidation to equilin (XIII).

The processes offer a novel, unique, and feasible route to compounds difficult or impossible to obtain from natural steroids, when the 13-alkyl group is polycarbon alkyl. The 13-polycarbonalkyl group can be of varying chain length, such as, for example, ethyl, propyl, isopropyl, butyl, isobutyl, pentyl, etc., and even cetyl, and for the processes of the invention when such groups are present in the starting material they will correspondingly be present in the intermediates, and the final product, and as intermediates and in the processes of the invention, are the full equivalents of the compounds particularly described and claimed.

It will be apparent to those skilled in the art that the starting compounds can bear groups which are unaffected by the process of the invention such as 6-methyl; 7-methyl; 11,12- or 16-hydroxyl; 16-fluoro, etc., and these variations as intermediates, and in the processes of the invention, are full equivalents of the compounds and processes as particularly described.

It will also be apparent to those skilled in the art that where in the composition aspect of the invention there is a hydroxy group present this group can be esterified with a carboxylic acid such as, for example, acetic, propionic, butyric, decanoic, benzoic, etc. either directly or by means of derivatives such as their anhydrides or halides, to form esters and such esters are full equivalents of the compounds of the corresponding intermediates and products in their applied use characteristic of exerting qualitatively varying hormonal effects differing in degree of activity rather than kind. Similarly the corresponding inorganic acid esters such as, for example, the 17-sulfate and the 17-phosphate can be prepared and are the full equivalents of the composition aspect of the invention in the applied use characteristic of exerting hormonal effects.

While the tetracyclic compounds in the specification and the appended examples are usually named to describe the configuration corresponding to that of the natural steroid, it is to be understood, that the configuration is unaffected by the processes of the invention, so that if the starting material is a racemic mixture, the product will also be a racemic mixture, and if the starting material is a particular enantiomorphic configuration then the product will be of the same enantiomorphic series.

The following examples illustrate the best mode contemplated by the inventors of carrying out the processes of the invention and the manner of using as intermediates the compositions of the invention.

EXAMPLE 1

(±)-8,9-epoxy-3-methoxyestra-1,3,5(10)-trien-17-one

To a solution of (±)-3-methoxyestra-1,3,5(10),8-tetraen-17-one (28.0 g.) in benzene (550 ml.) and hexane (150 ml.) add potassium carbonate (28.0 g.). Stir the mixture at 0° C., then add solid m-chloroperbenzoic acid (19.0 g.) over a period of 5 minutes. Stir the reaction an additional 10 minutes at 0° C., then add 5% potassium carbonate solution (500 ml.) and stir the reaction mixture for 10 minutes more allowing it to warm up to room temperature. Separate the mixture and dilute the organic layer with ethyl acetate and wash well with 5% sodium hydroxide solution, with water and with saturated sodium chloride solution. Dry the extract over anhydrous sodium sulfate, filter and remove the solvents in vacuo. Heat the resulting oil to reflux with ether, then set aside to allow complete crystallization. Filter the resulting white crystalline material to obtain 24.5 g. of title product, M.P. 132–136°;

$\lambda_{max.}^{KBr}$ 5.74μ

EXAMPLE 2

(±)-8-hydroxy-3-methoxyestra-1,3,5(10),9(11)-tetraen-17-one

Dissolve (±)-8,9-epoxy-3-methoxyestra-1,3,5(10)-trien-17-one (3.00 g., M.P. 127–131°) in a solution containing benzoic acid (2.0 g.) in chloroform (75 ml.). Stir the resulting solution at room temperature overnight. Remove the chloroform in vacuo and dissolve the residue in ether-ethyl acetate (1:2). Wash the extract well with saturated sodium bicarbonate solution, with water and with saturated sodium chloride solution, and dry over anhydrous sodium sulfate. Filter the solution and remove the solvents in vacuo. Dissolve the resulting colorless oil in ether and allow the solution to stand at room temperature. Filter off the resulting tiny colorless prisms of (±) - 8-hydroxy-3-methoxyestra-1,3,5(10),9(11)-tetraen-17-one to yield 2.00 g. of the title product; M.P. 148–150°;

$\lambda_{max.}^{KBr}$ 2.9 and 5.75$\mu$; $\lambda_{max.}^{EtOH}$ 259 m$\mu$ ($\epsilon$ 17,400)

Analysis.—Calculated for $C_{19}H_{22}O_3$ (percent): C, 76.48; H, 7.43. Found (percent): C, 76.58; H, 7.39.

EXAMPLE 3

(±)-8-hydroxy-3-methoxyestra-1,3,5(10),9(11)-tetraen-17-one

To a stirred solution of (±)-3-methoxyestra-1,3,5(10), 8-tetraen-17-one (6.00 g.) in benzene (175 ml.) and hexane (35 ml.), add potassium carbonate (6.0 g.) and cool the mixture to 0° C. At this temperature and with stirring add m-chloroperbenzoic acid (4.00 g.) and stir the mixture for 10 minutes. Quench the reaction by the addition of a 5% potassium carbonate solution (200 ml.). Stir the mixture for a few minutes at room temperature and separate the layers. Dilute the organic layer with ether and wash well with 5% sodium hydroxide solution, with water and with saturated sodium chloride solution, and dry over anhydrous sodium sulfate. Filter the solution and remove the solvents in vacuo. Cover the yellow residue with ether-petroleum ether, boil, then allow to stand to crystallize. Filter off the white crystalline precipitate to yield 4.70 g. of crude product; M.P. 130–136°. Purify the product further by dissolving it in boiling benzene, treating with activated charcoal (Nuchar) and filtering hot through Super-Cel. Boil the filtrate to low volume and allow to stand at room temperature to complete crystallization. Filter off the resulting clusters of prisms to give 3.63 g. of the title product; M.P. 152–155° C.;

$\lambda_{max.}^{KBr}$ 2.9 and 5.75$\mu$; $\lambda_{max.}^{EtOH}$ 259 m$\mu$ ($\epsilon$ 19,300)

Analysis.—Calculated for $C_{19}H_{22}O_3$ (percent): C, 76.48; H, 7.43. Found (percent): C, 76.50; H, 7.24.

EXAMPLE 4

(±)-8-hydroxy-3-methoxyestra-1,3,5(10)-trien-17-one

Pretreat a mixture of 5% palladium on carbon (1.5 g.) and absolute ethanol (50 cc.) with hydrogen at one atmosphere. Then add a solution of (±)-8-hydroxy-3-methoxyestral - 1,3,5(10),9(11) - tetraen - 17 - one (3.00 g.) in absolute ethanol (100 ml.). Treat the solution with hydrogen until uptake of the gas is complete. Filter the solution twice through Super-Cel and remove the ethanol in vacuo. Dissolve the resulting oil in methylene chloride, treat with activated charcoal (Nuchar) and filter through Super-Cel. Remove the methylene chloride in vacuo and cover the resulting colorless oil with ether. Filter the white crystalline product to afford 2.56 g. of the title product; M.P. 136–138°;

$\lambda_{max.}^{KBr}$ 2.9 and 5.75$\mu$

Analysis.—Calculated for $C_{19}H_{24}O_3$ (percent): C, 75.97; H, 8.05. Found (percent): C, 76.03; H, 8.13.

EXAMPLE 5

(±)-3-methoxyestra-1,3,5(10),7-tetraen-17-one

Dissolve a sample of (±)-8-hydroxy-3-methoxyestra-1,3,5(10)-trien-17-one (0.50 g. from Example 4) in methanol (25 ml.). To the solution at room temperature add dropwise, acetyl chloride (a total of 10 ml.) at a rate to prevent excess sputtering of the spontaneously refluxing solvent. After complete addition boil the solution on the steam bath until the volume of solvent is reduced to below 10 ml. Allow the solution to stand at room temperature to deposit 0.37 g. of white crystals of the title product; M.P. 126–128°;

$\lambda_{max.}^{KBr}$ 5.75$\mu$

Analysis.—Calculated for $C_{19}H_{22}O_2$ (percent): C, 80.81; H, 7.85. Found (percent): C, 80.68; H, 7.65.

EXAMPLE 6

(±)-3-methoxyestra-1,3,5(10),7-tetraen-17-one

To a solution of (±)-8-hydroxy-3-methoxyestra-1,3,5-(10)-trien-17-one (4.00 g.) in pyridine (50 ml.) add methanesulfonyl chloride (20 ml.). Heat the yellow solution on a steam bath in a flask fitted with a reflux condenser. Continue heating until the exothermic reaction is initiated and spontaneous refluxing occurs. Remove the heat until the reaction subsides (about 5 minutes). Again supply the heat for ½ hour to complete the reaction. Allow the black mixture to cool then decompose it with ice water (200 ml.). Add a few ml. of ether, then blow it off with nitrogen. Scratch the flask to induce crystallization. Filter the resulting dark brown solid and air-dry. Dissolve the solid in methylene chloride and treat with activated charcoal (Nuchar), boil, then allow to cool to room temperature. Filter the dark red solution through Super-Cel. Replace the methylene chloride with absolute ethanol by boiling on the steam bath, then allow to cool. Filter the resulting red crystals to afford 2.74 g. of crude title product; M.P. 129–131°. Purify the product further by dissolving it in benzene and filtering through a short column of Florex. Evaporate the benzene filtrate in vacuo and cover the residue with methanol. Filter the resulting pink crystalline material to give 2.32 g. of title product, M.P. 130–132°;

$\lambda_{max.}^{KBr}$ 5.75$\mu$

Analysis.—Calculated for $C_{19}H_{22}O_2$ (percent): C, 80.81; H, 7.85. Found (percent): C, 80.68; H, 7.55.

EXAMPLE 7

(±)-8,9-epoxy-13-ethyl-3-methoxygona-1,3,5(10)-trien-17-one

Add potassium bicarbonate (2 g.) to hexane (70 ml.) and stir the suspension at 0° C. To the suspension add simultaneously, a solution of (±)-13-ethyl-3-methoxygona-1,3,5(10),8-tetraen-17-one (3.00 g.) in benzene (25 ml.) and a suspension of m-chloroperbenzoic acid (2.0 g.) in benzene (25 ml.) over a period of 15 minutes. After complete addition of the reactants, continue stirring for 15 minutes longer at 0° C. Quickly filter the resulting white precipitate. Wash the filtrate into a separatory funnel with ether. Wash the extract well with 5% sodium hydroxide, with water and with saturated sodium chloride solution, then dry it over anhydrous sodium sulfate. Filter the extract and remove the solvents in vacuo to give a white crystalline solid. Dissolve the solid in boiling hexane containing a few drops of benzene and filter hot. Boil the filtrate to bring all solids back into solution and allow to stand at room temperature to complete crystallization. Filter tre resulting colorless plates to give 2.18 g. of the pure title product; M.P. 125.7–127.0°;

$\lambda_{max.}^{KBr}$ 5.79$\mu$; $\lambda_{max.}^{EtOH}$ 237, 277 and 286$\mu$ ($\epsilon$ 13,000; 1,600; and 1,600 respectively).

Analysis.—Calculated for $C_{20}H_{24}O_3$ (percent): C, 76.89; H, 7.74. Found (percent): C, 77.18; H, 7.61.

EXAMPLE 8

(±)-8,9-epoxy-13-ethyl-3-methoxygona-1,3,5(10)-trien-17-one

To a solution of (±)-13-ethyl-3-methoxygona-1,3,5(10), 8-tetraen-17-one (24.0 g.) in benzene (500 ml.) and hexane (140 ml.) add potassium carbonate (24.0 g.). Stir the mixture at 0° C., then add solid m-chloroperbenzoic acid (16.0 g.) over 5 minutes. Stir the reaction mixture an additional 10 minutes at 0°, then add 5% potassium carbonate solution (500 ml.) and stir the reaction for 10 minutes more allowing it to warm up to room temperature. Separate the mixture and dilute the organic layer with ethyl acetate and wash well with 5% sodium hydroxide solution, with water and with saturated sodium chloride solution. Dry the extract over anhydrous sodium sulfate, filter and remove the solvents in vacuo. Heat the resulting oil to reflux with ether then set aside to allow complete crystallization. Filter the resulting white crystals to give 15.0 g. of the title product, M.P. 120–125°.

EXAMPLE 9

±-8-hydroxy-3-methoxy-13-ethylgona-1,3,5(10),9(11)-tetraen-17-one

Dissolve a sample of (±)-8,9-epoxy-3-methoxy-13-ethylgona-1,3,5(10)-trien-17-one (5.00 g.) in a solution containing benzoic acid (3.0 g.) in chloroform (100 ml.) and stir at room temperature for 18 hours. Remove the chloroform in vacuo and dissolve the residue in a mixture of ether and ethyl acetate. Wash the extract well with saturated sodium bicarbonate solution, with water and with saturated sodium chloride solution, then briefly dry it over anhydrous sodium sulfate. Filter the solution and remove the solvents in vacuo. Dissolve the resulting yellow oil in ether and allow the solution to stand at 10° C. to allow complete crystallization. Filter the resulting white crystalline material to give 3.00 g. of the title product; M.P. 118–121°;

$\lambda_{max.}^{KBr}$ 2.9 and 5.80$\mu$; $\lambda_{max.}^{EtOH}$ 258 m$\mu$ ($\epsilon$ 17,600)

*Analysis.*—Calculated for $C_{20}H_{24}O_3$ (percent): C, 76.89; H, 7.74. Found (percent): C, 76.89; H, 7.47.

EXAMPLE 10

(±)-8-hydroxy-3-methoxy-13-ethylgona-1,3,5(10)-trien-17-one

Pretreat a mixture of 5% palladium on carbon (4.0 g.) and absolute ethanol (50 ml.) with hydrogen at atmospheric pressure, then add a solution of (±)-8-hydroxy-3-methoxy-13-ethylgona-1,3,5(10),9(11)-tetraen-17-one (10.0 g. from Example 9) in absolute ethanol (250 ml.). Treat the solution with hydrogen until uptake of the gas is complete. Filter the solution through Super-Cel and remove the ethanol in vacuo. Dissolve the resulting oil in methylene chloride, treat with activated charcoal (Nuchar) and filter through Super-Cel. Remove the methylene chloride in vacuo. Dissolve the resulting colorless oil in boiling ether, then allow to stand at room temperature to complete crystallization. Filter the resulting colorless prisms to yield 7.6 g. of title product; M.P. 127–129° with partial resolidification followed by M.P. 147–149°;

$\lambda_{max.}^{KBr}$ 2.9 and 5.74$\mu$

*Analysis.*—Calculated for $C_{20}H_{26}O_3$ (percent): C, 76.40; H, 8.34. Found (percent): C, 76.49; H, 8.19.

EXAMPLE 11

(±)-3-methoxy-13-ethylgona-1,3,5(10),7-tetraen-17-one

Dissolve a sample of (±)-8-hydroxy-3-methoxy-13-ethylgona-1,3,5(10)-trien-17-one (2.00 g. from Example 10) in methanol (25 ml.). To the stirred solution add, dropwise, acetylchloride (a total of 15 ml.) at a rate to prevent excess sputtering of the boiling solution. After complete addition, dilute the solution with ethanol (25 ml.) then boil on the steam bath until the volume of the solution is reduced to about 15 ml. Allow the solution to cool and add a few drops of ether to prevent cloudiness. Scratch with a glass rod, and filter to obtain 1.45 g. of the title product; M.P. 110–116°. Purify the product further by dissolving it in methylene chloride and treat with activated charcoal, then filter through Super-Cel. Replace the methylene chloride with ethanol by boiling on the steam bath. Allow the solution to stand at room temperature to deposit 1.23 g. of white prism clusters of the title product, M.P. 110–115°;

$\lambda_{max.}^{KBr}$ 5.75$\mu$

*Analysis.*—Calculated for $C_{20}H_{24}O_2$ (percent): C, 81.04; H, 8.16. Found (percent): C, 80.68; H, 7.89.

EXAMPLE 12

(±)-3-methoxy-13-ethylgona-1,3,5(10),7-tetraen-17-one

In exactly the same manner as described in Example 6, react (±)-8-hydroxy-3-methoxy-13-ethylgona-1,3,5-(10)-trien-17-one (4.00 g.) with methanesulfonyl chloride (20 ml.) in pyridine (50 ml.) to obtain from ethanol 2.45 g. of the crude (±)-3-methoxy-13-ethylgona-1,3,5-(10),7 - tetraen-17-one as red plates, M.P. 118–122°. Purify this product further by filtration of a benzene solution through a column of Florex and remove the benzene in vacuo. The residue upon trituration with methanol deposits 2.17 g. of the title product as a pink crystalline solid; M.P. 122–124°;

$\lambda_{max.}^{KBr}$ 5.77$\mu$

*Analysis.*—Calculated for $C_{20}H_{24}O_2$ (percent): C, 81.04; H, 8.16. Found (percent): C, 81.11; H, 8.31.

EXAMPLE 13

(±)-3-methoxy-8,9-epoxyestra-1,3,5(10)-trien-17-one, ethylene ketal

Cool a solution of (±)-3-methoxyestra-1,3,5(10),8-tetraen-17-one, ethylene ketal (6.00 g.) in benzene (175 ml.) and hexane (40 ml.) to 0° C., then add anhydrous potassium carbonate (6.0 g.) and m-chloroperbenzoic acid (4.0 g.). Stir the solution at 0° for 4 minutes, then quickly quench it by adding a 5% potassium carbonate solution (500 ml.) and stir a few minutes more at room temperature. Separate the layers and dilute the organic layer with ethyl acetate. Wash the extract well with 5% sodium hydroxide solution, with water and with saturated sodium chloride solution, then dry it over anhydrous sodium sulfate. Filter the solution and remove the solvents in vacuo. Dissolve the resulting colorless oil in boiling ether, scratch the flask with a glass rod to initiate crystallization, then allow the solution to stand at room temperature to completely precipitate the product. Filter the white crystalline material to give 5.0 g. of the title product; M.P. 127.5–129.5°;

$\lambda_{max.}^{EtOH}$ 235 m$\mu$ ($\epsilon$ 12,200)

*Analysis.*—Calculated for $C_{21}H_{26}O_4$ (percent): C, 73.66; H, 7.66. Found (percent): C, 73.59; H. 7.42.

EXAMPLE 14

(±)-3-methoxy-8-hydroxyestra-1,3,5(10),9(11)-tetraen-17-one, ethylene ketal

Stir a solution of (±)-3-methoxy-8,9-epoxyestra-1,3,5 (10)-trien-17-one, ethylene ketal (4.00 g.) and benzoic acid (3.0 g.) in chloroform (150 ml.) at room temperature for 20 hrs. Remove the solvent in vacuo and dissolve the residue in ethyl acetate. Wash the extract well with 5% potassium carbonate solution, with water and with saturated sodium chloride solution then dry it over anhydrous sodium sufate. Filter the solution and remove the solvent in vacuo. Dissolve the oil in ether and scratch with a glass rod to initiate crystallization. Filter the deposited 2.18 g. of tiny white prisms of the title product; M.P. 139–141°;

$\lambda_{max.}^{KBr}$ 3.15 and 6.12$\mu$.; $\lambda_{max.}^{EtOH}$ 258 m$\mu$ ($\epsilon$ 18,850)

*Analysis.*—Calculated for $C_{21}H_{26}O_4$ (percent): C, 73.66; H, 7.66. Found (percent): C, 73.80; H, 7.61.

Obtain a second crop of 1.12 g. (M.P. 127–131°) by diluting the above mother liquors with petroleum ether.

EXAMPLE 15

(±)-3-methoxy-8-hydroxyestra-1,3,5(10)-trien-17-one, ethylene ketal

Pretreat a mixture of 5% palladium on charcoal (0.50 g.) and absolute ethanol (25 ml.) with hydrogen at atmospheric pressure until saturation of the catalyst is complete. Then add a solution of (±)-3-methoxy-8-hydroxyestra - 1,3,5(10),9(11)-tetraen-17-one, ethylene ketal (1.36 g.) in absolute ethanol (75 ml.). Treat the solution with hydrogen until no more uptake of the gas is observed. Filter the mixture through Super-Cel and remove the ethanol in vacuo. Dissolve the resulting oil in methylene chloride and treat with Nuchar charcoal. Filter the mixture through Super-Cel and remove the solvent in vacuo. Dissolve the residue in ether and allow it to stand to complete crystallization. Filter the resulting tiny, shiny needles to give 0.69 g. of the title product; M.P. 131–132°;

$\lambda_{max.}^{KBr}$ 2.88μ

*Analysis.*—Calculated for $C_{21}H_{28}O_4$ (percent): C, 73.22; H, 8.19. Found (percent): C, 73.05; H, 8.10.

EXAMPLE 16

(±)-3-methoxyestra-1,3,5(10),7-tetraen-17-one, ethylene ketal

To a solution of (±)-3-methoxy-8-hydroxyestra-1,3-5(10)-trien-17-one, ethylene ketal (1.50 g.) in pyridine (15 ml.) add methane sulfonyl chloride (7 ml.). Heat the solution on a steam bath until a vigorous exothermic reaction causes reflux of the solvent, then remove the heat until the reaction subsides. Then reapply the heat again for a period of 15 minutes more to complete the reaction. Cool the reaction to room temperature then decompose the reaction with ice-water and ether. Blow the ether layer off with nitrogen and filter and air-dry the resulting solid. Dissolve the solid in methylene chloride, treat with Nuchar charcoal and filter through Super-Cel. Remove the solvent in vacuo and boil the resulting yellow oil in methanol, then allow the mixture to stand to crystallize. Filter the resulting slightly yellow crystals to give 0.90 g. of the title product; H.P. 106–109°. Purify the product further by dissolving in benzene and passing the solution through a short column of Florex XXS. Evaporate the benzene eluent in vacuo and triturate the resulting oil with methanol. Filter the resulting slightly yellow prisms to give 0.77 g. of the pure title product; M.P. 119–121°.

*Analysis.*—Calculated for $C_{21}H_{26}O_3$ (percent): C, 77.27; H, 8.03. Found (percent): C, 77.07; H, 7.87.

EXAMPLE 17

(±)-3-methoxy-13-ethyl-8,9-epoxygona-1,3,5(10)-trien-17-one, ethylene ketal

Cool a solution of (±)-3-methoxy-13-ethlygona-1,3,5(10),8-tetraen-17-one, ethylene ketal (12.0 g.) in benzene (250 ml.) and hexane (70 ml.) to 0° C., then add potassium carbonate (12.0 g.) and m-chloroperbenzoic acid (8.0 g.) to the stirred solution. Continue stirring at 0° for 7 minutes; then quickly quench the mixture by adding 5% potassium carbonate solution (300 ml.). Continue stirring a few minutes at room temperature, then separate the layers and dilute the organic layer with ethyl acetate. Wash the extract well with 5% sodium hydroxide solution, with water and with saturated sodium chloride solution then dry the extract over anhydrous sodium sulfate. Filter the solution and remove the solvents in vacuo. Triturate the slightly yellow residue with boiling ether and allow to cool to completely crystallize. Filter the white prisms to give 10.9 g. of the title product; M.P. 162–166°. Purify a sample (1.90 g.) for analysis by dissolving in boiling benzene then diluting with hexane (twice the volume of benzene). Boil the solution on the steam bath to one-half volume then allow to cool to deposit 1.70 g. of large colorless prisms of title product; M.P. 175–178°;

$\lambda_{max.}^{EtOH}$ 235.5 mμ (ε 12,900)

*Analysis.*—Calculated for $C_{22}H_{28}O_4$ (percent): C, 74.13; H, 7.92. Found (percent): C, 74.18; H, 7.82.

EXAMPLE 18

(±)-3-methoxy-8-hydroxy-13-ethylgona-1,3,5(10),9(11)-tetraen-17-one, ethylene ketal Stir a solution of (±)-3-methoxy-8,9-epoxy-13-ethylgona-1,3,5(10)-trien-17-one, ethylene ketal (9.00 g.) and benzoic acid (5.0 g.) in chloroform (200 ml.) at room temperature for 24 hours. Remove the solvent in vacuo and dissolve the residue in ethyl acetate-ether. Wash the extract well with 5% potassium carbonate solution, with water and with saturated sodium chloride solution then dry over anhydrous sodium sulfate. Filter the solution and remove the solvents in vacuo. Dissolve the resulting oil in boiling ether, allow to cool, and scratch with a glass rod to promote crystallization. Filter the resulting white shiny plates to give 6.14 g. of the title product; M.P. 145–147°;

$\lambda_{max.}^{KBr}$ 2.95 and 6.13μ; $\lambda_{max.}^{EtOH}$ 260 mμ (ε 19,200)

*Analysis.*—Calculated for $C_{22}H_{28}O_4$ (percent): C, 74.13; H, 7.92. Found (percent): C, 74.01; H, 7.71.

EXAMPLE 19

(±)-2-methoxy-8-hydroxy-13-ethylgona-1,3,5,(10)-trien-17-one, ethylene ketal

Pretreat a mixture of 5% palladium on charcoal (3.0 g.) and ethanol (50 ml.) with hydrogen at atmospheric pressure until saturation of the catalyst is complete. Then add a solution of (±)-3-methoxy-8-hydroxy-13; ethylgona-1,3,5,(10),9(11)-tetraen-17-one, ethylene ketal (6.00 g.) in absolute ethanol (200 ml.). Treat the solution with hydrogen until uptake of the gas is complete. Filter the mixture through Super-Cel and remove the ethanol in vacuo. Dissolve the resulting oil in methylene chloride and that with Nuchar charcoal. Filter the mixture through Super-Cel and remove the solvent in vacuo. Dissolve the residue in ether (hot) and allow to stand to complete crystallization. Filter the resulting fine white crystals to give 4.20 g. of the title product; M.P. 166–168°;

$\lambda_{max.}^{KBr}$ 2.86μ

*Analysis.*—Calculated for $C_{22}H_{30}O_4$ (percent): C, 73.71; H, 8.44. Found (percent): C, 73.62; H, 8.58.

EXAMPLE 20

(±)-3-methoxy-13-ethylgona-1,3,5(10),7-tetraen-17-one, ethylene ketal

To a solution of (±)-3-methoxy-8-hydroxy-13-ethylgona-1,3,5(10)-trien-17-one, ethylene ketal (1.50 g.) in pyridime (15 ml.) add methanesulfonyl chloride (7.1). Heat the solution on a steam bath until a vigorous exothermic reaction causes reflux of the solvent, then remove the heat until the reaction subsides. Then reapply the heat for a period of 15 minutes more to complete the reaction. Cool the reaction to room temperature then decompose with ice-water and ether. Blow off the ether layer with nitrogen and filter and air-dry the resulting solid. Dissolve the solid in methylene chloride, treat with Nuchar charcoal and filter through Super-Cel. Remove the solvent in vacuo and boil the resulting yellow oil in methanol, then allow to stand to crystallize. Filter the resulting yellow crystalline solid to give 1.20 g. of the title product, M.P. 128–131°. Purify the product further by dissolving it in benzene and passing the solution through a short column of Florex XXS. Remove the benzene in vacuo and cover the resulting oil with methanol. Filter the resulting fine pale yellow crystalline solid to give 0.92 g. of the pure title product; M.P. 131–133°.

*Analysis.*—Calculated for $C_{22}H_{28}O_3$ (percent): C, 77.61; H, 8.29. Found (percent): C, 77.70; H, 8.14.

EXAMPLE 21

(±)-3-methoxy-8,9-epoxyestra-1,3,5(10)-trien-17β-ol and (±) - 3 - methoxyestra-1,3,5(10),9(11)-tetraene-8,17β-diol Dissolve a sample of (±)-3-methoxyestra-1,3,5(10),8-tetraen-17β-ol (3.00 g.) in benzene (100 ml.) and hexane (30 ml.) and add anhydrous potassium carbonate (3.0 g.) to the solution. Cool the mixture to 0° C., add m-chloroperbenzoic acid (2.00 g.) and continue stirring at 0° C. for 3.5 minutes more. Quickly quench the reaction by adding a 5% potassium carbonate solution (200 ml.). Stir the mixture, separate the layers and dilute the organic layer with ethyl acetate. Wash the extract well with 5% sodium hydroxide solution, with water and with saturated sodium chloride solution then dry it over anhydrous sodium sulfate. Filter the solution and remove the solvents in vacuo. Cover the residue with ether and triturate, then allow to stand at room temperature to complete precipitation. Filter to afford 1.95 g. of the mixture of title products; M.P. 159–167°.

EXAMPLE 22

(±)-3-methoxy-8,9-epoxyestra-1,3,5(10) - trien - 17β-ol and (±)-3-methoxyestra - 1,3,5(10),9(11) - tetraene-8,17β-diol Cool a solution of (±)-3-methoxyestra-1,3,5(10),8-tetraen-17β-ol (9.0 g.) in benzene (250 ml.) and hexane (25 ml.) to 0° C. and add potassium carbonate (9.0 g.). With stirring, add m-chloroperbenzoic acid (6.0 g.) and continue stirring at 0° for 15 minutes. Quench the reaction with 5% potassium carbonate solution (250 ml.) and stir for 15 minutes at room temperature. Separate the layers and dilute the organic layer with ethyl acetate. Wash the extract well with 5% sodium hydroxide solution, with water and with saturated sodium chloride solution then dry it over anhydrous sodium sulfate. Filter the solution and remove the solvents in vacuo. Dissolve the resulting oil in hot ether and allow to stand to complete crystallization. Filter the fine white crystalline precipitate to give 5.57 g. of the mixture of title products; M.P. 147–149°. The mother liquors from the above filtration contain mostly the non-crystalline epoxide. Evaporate the mother liquors in vacuo then set them aside for conversion to the pure (±) - 3 - methoxyestra-1,3,5(10),9(11)-tetraene-8,17β-diol as described in Example 24.

EXAMPLE 23

(±)-3-methoxyestra-1,3,5(10),9(11)-tetraene-8,17β-diol

Dissolve the mixture of products from Example 21 (1.87 g.) and benzoic acid (1.0 g.) in chloroform (50 ml.) and stir the solution at room temperature for 18 hours. Remove the chloroform in vacuo and dissolve the residue in ethyl acetate. Wash the extract well with 5% potassium carbonate solution, with water and with saturated sodium chloride solution then dry it over anhydrous sodium sulfate. Filter the solution and remove the solvent in vacuo. Dissolve the resulting oil in ether and allow to stand to complete crystallization. Filter the resulting prismatic needles to afford 1.42 g. of the title product; M.P. 173–176°;

$\lambda_{max.}^{KBr}$ 2.92, 3.07 and 6.12$\mu$; $\lambda_{max.}^{EtOH}$ 259 m$\mu$ ($\epsilon$ 16,400)

EXAMPLE 24

(±)-3-methoxyestra - 1,3,5(10),9(11) - tetraene - 8,17β-diol

Dissolve the mixture of title products from Example 22 (4.00 g.) and benzoic acid (3.0 g.) in chloroform (100 ml.) and stir the solution at room temperature overnight. Remove the chloroform in vacuo and dissolve the residue in ethyl acetate. Wash the extract well with 5% potassium carbonate solution, with water and with saturated sodium chloride solution and dry over anhydrous sodium sulfate. Filter the solution and remove the solvents in vacuo. Dissolve the resulting oil in boiling ether and allow to stand at room temperature to crystallize. Filter the colorless prisms to yield 3.43 g. of the title product, M.P. 176–178°;

$\lambda_{max.}^{KBr}$ 2.90, 3.07 and 6.13$\mu$; $\lambda_{max.}^{EtOH}$ 259 m$\mu$ ($\epsilon$ 18,000)

*Analysis.*—Calculated for $C_{19}H_{24}O_3$ (percent): C, 75.97; H, 8.05. Found (percent): C, 75.66; H, 8.04.

Dissolve the mother liquors from Example 22 (which contain mostly the non-crystalline epoxide) in chloroform (100 ml.) containing benzoic acid (4.0 g.) and stir at room temperature for 3 days. Remove the solvent in vacuo and work up the residue exactly as described above to yield a further 2.35 g. of crude (±)-3-methoxyestra-1,3,5(10),9(11) - tetraene - 8,17β - diol; M.P. 150–153°. Purify this material further by dissolving in boiling methylene chloride and allow to stand to deposit 1.52 g. of the title product as a fluffy white solid; M.P. 173–175° identical in spectral properties to the title product.

EXAMPLE 25

(±)-3-methoxyestra-1,3,5(10)-triene-8,17β-diol

Pretreat a mixture of 5% palladium on charcoal (2.0 g.) and ethanol (50 ml.) with hydrogen at atmospheric pressure until saturation of the catalyst is complete. Add a solution of (±) - 3 - methoxyestra - 1,3,5(10),9(11)-tetraene-8,17β-diol (3.75 g.) in absolute ethanol (100 ml.) and tetrahydrofuran (10 ml.). Treat the solution with hydrogen until uptake of the gas is complete. Filter the mixture through Super-Cel and remove the solvents in vacuo. Dissolve the resulting oil in tetrahydrofuran and treat with Nuchar charcoal. Filter the mixture through Super-Cel and remove the solvent in vacuo. Boil the residue with ether and set aside to complete crystallization. Filter the white fluffy crystalline solid to give 3.26 g. of the title product; M.P. 178–180°;

$\lambda_{max.}^{KBr}$ 2.98 and 3.05$\mu$

*Analysis.*—Calculated for $C_{19}H_{26}O_3$ (percent): C, 75.46; H, 8.67. Found (percent): C, 75.30; H, 8.39.

EXAMPLE 26

(±)-3-methoxyestra-1,3,5(10),7-tetraen-17β-ol, methane sulfonate

To a solution of (±)-3-methoxy-13,17α-diethylgona-8,17β-diol (1.00 g.), in pyridine (10 ml.), add methanesulfonyl chloride (5 ml.). Heat the solution on a steam bath until the vigorous exothermic reaction causes reflux of the solvent, then remove the heat until the reaction subsides. Reapply the heat for a period of 15 minutes more to complete the reaction. Cool the reaction to room temperature then decompose with ice-water and ether. Blow the ether layer off with nitrogen and filter and air-dry the resulting solid. Dissolve the solid in methylene chloride, treat with Nuchar charcoal and filter through Super-Cel. Replace the solvent with absolute ethanol by boiling on the steam bath, allow to stand to complete crystallization, to give 0.92 g. of the title product as an off-white crystalline material, M.P. 137–139°. Purify a sample (0.72 g.) of the product by dissolving in benzene and passing the solution through a short column of Florex XXS. Evaporate the benzene in vacuo and triturate the resulting oil with methanol. Filter the white crystalline solid to give 0.61 g. of the pure title product; M.P. 138–140°.

*Analysis.*—Calculated for $C_{20}H_{26}O_4S$ (percent): C, 66.27; H, 7.23; S, 8.9. Found (percent): C, 66.53; H, 7.11; S, 9.2.

EXAMPLE 27

(±)-3-methoxy-8,9-epoxy-13,17α-diethylgona-1,3,5(10)-trien-17β-ol

To a solution of (±)-3-methoxy-13,17α-diethylgona-1,3,5(10),8-tetraen-17β-ol (12.0 g.) in benzene (250 ml.) add anhydrous potassium carbonate (12.0 g.) and hexane (70 ml.), and cool the mixture to 0° C. With stirring add m-chloroperbenzoic acid (8.0 g.) to the solution and stir at 0° for 8 minutes. Quench the reaction by the addition of 5% potassium carbonate solution (250 ml.). Stir the mixture for 10 minutes then separate the layers. Dilute the organic layer with ethyl acetate and wash well with 5% sodium hydroxide solution, with water and with saturated sodium chloride solution and dry over anhydrous sodium sulfate. Filter the extract and remove the solvents in vacuo. Triturate the gummy solid with ether and allow to stand to complete crystallization. Filter the white shiny plates of the title product to give 11.5 g.; M.P. 147–152°;

$\lambda_{max.}^{KBr}$ 2.87μ; $\lambda_{max.}^{EtOH}$ 235 mμ (ε 12,300)

A sample from a previous preparation gives the following analysis:

*Analysis.*—Calculated for $C_{22}H_{30}O_3$ (percent): C, 77.15; H, 8.83. Found (percent): C, 76.84; H, 8.47.

EXAMPLE 28

(±)-3-methoxy-13,17α-diethylgona-1,3,5(10),9(11)-tetraene-8,17β-diol

Stir a solution of (±)-3-methoxy-8,9-epoxy-13,17α-diethylgona-1,3,5(10)-trien-17β-ol (11.5 g.) and benzoic acid (8.0 g.) in chloroform (250 ml.) at room temperature for 24 hours. Wash the solution well with 5% potassium carbonate solution and dry over anhydrous sodium sulfate. Filter the solution and remove the chloroform in vacuo. Triturate the residue with ether to give, as a white crystalline solid, the title product; 6.50 g.; M.P. 161–164°;

$\lambda_{max.}^{KBr}$ 2.90, 2.98 and 6.12μ; $\lambda_{max.}^{EtOH}$ 261 mμ (ε 18,200)

*Analysis.*—Calculated for $C_{22}H_{30}O_3$ (percent): C, 77.15; H, 8.83. Found (percent): C, 77.18; H, 8.77.

EXAMPLE 29

(±)-3-methoxy-13,17α-diethylgona-1,3,5(10)-triene-8,17β-diol

Pretreat a mixture of 5% palladium on charcoal (2.00 g.) and ethanol (50 ml.) with hydrogen at atmospheric pressure until saturation of the catalyst is complete. Add a solution of (±)-3-methoxy-13,17α-diethylgona-1,3,5-(10),9(11)-tetraene-8,17β-diol (4.00 g.) in absolute ethanol (100 ml.) and tetrahydrofuran (100 ml.). Treat the solution with hydrogen until uptake of the gas is complete. Filter the mixture through Super-Cel and remove the solvents in vacuo. Dissolve the resulting oil in methylene chloride and treat with Nuchar charcoal. Filter the mixture through Super-Cel and remove the solvent in vacuo. Dissolve the residue in boiling ether and allow to stand to crystallize. Filter the resulting colorless prisms to give 2.50 g. of the title product; M.P. 156.5–158.5.

$\lambda_{max.}^{KBr}$ 2.85μ

*Analysis.*—Calculated for $C_{22}H_{32}O_3$ (percent): C, 76.70; H, 9.36. Found (percent): C, 76.55; H, 9.07.

EXAMPLE 30

(±)-3-methoxy-13,17-diethylgona-1,3,5(10),7,17(20)-pentaene

To a solution of (±)-3-methoxy-13,17β-diethylgona-1,3,5(10)-triene-8,17β-diol (1.00 g.) in pyridine (12 ml.) add methanesulfonyl chloride (5 ml.). Heat the solution on a steam bath until a vigorous exothermic reaction causes reflux of the solvent, then remove the heat until the reaction subsides. Reapply the heat for a period of 15 minutes more to complete the reaction. Cool the reaction to room temperature then decompose with ice-water and ether. Blow the ether layer off with nitrogen and filter the resulting solid and air-dry. Dissolve the solid in methylene chloride, treat with Nuchar charcoal and filter through Super-Cel. Remove the solvent in vacuo and dissolve the oil in ethanol. Filter the resulting crystalline material to give, in two crops, 0.44 g. of the title product; M.P. 105–110°. Combine the two crops and further purify by dissolving in benzene and passing the solution through a short column of Florex XXS. Evaporate the benzene eluent in vacuo and triturate the resulting yellow oil with methanol. Filter the slightly yellow crystalline solid to give 0.33 g. of the pure title product; M.P. 110–112°.

*Analysis.*—Calculated for $C_{22}H_{28}O$ (percent): C, 85.66; H, 9.15. Found (percent): C, 85.12; H, 8.89.

EXAMPLE 31

(±)-3-methoxyestra-1,3,5(10),8-tetraene-17β-ol, acetate

Dissolve (±)-3-methoxyestra-1,3,5(10),8-tetraen-17β-ol (15.0 g.) in pyridine (50 ml.) and acetic anhydride (40 ml.) and allow to stand at room temperature overnight. Pour the reaction into ice-water and filter the resulting white crystalline precipitate and air dry. Dissolve the solid in methylene chloride and treat with Nuchar charcoal and filter through Super-Cel. Replace the methylene chloride with absolute ethanol by boiling on the steam bath and allow to stand to complete crystallization. Filter the resulting shiny plates to give 15.3 g. of the title product; M.P. 119–121°;

$\lambda_{max.}^{KBr}$ 5.75 and 6.12μ; $\lambda_{max.}^{EtOH}$ 276 mμ (ε 17,200)

*Analysis.*—Calculated for $C_{21}H_{26}O_3$ (percent): C, 77.27; H, 8.03. Found (percent): C, 77.01; H, 7.83.

EXAMPLE 32

(±)-3-methoxy-8,9-epoxyestra-1,3,5(10)-trien-17β-ol, acetate

Dissolve (±)-3-methoxyestra-1,3,5(10),8-tetraen-17β-ol, acetate (6.00 g.) in benzene (125 ml.) and hexane (35 ml.) and cool to 0° C. Add to the solution anhydrous potassium carbonate (6.0 g.) and m-chloroperbenzoic acid (4.0 g.) and stir the mixture at 0° for 4.5 minutes. Quench the reaction quickly with 5% potassium carbonate solution (250 ml.). Continue stirring a few minutes at room temperature then separate the layers and dilute the organic layer with ether. Wash the extract with 5% sodium hydroxide solution, water and with saturated sodium chloride solution and dry over anhydrous sodium sulfate. Filter the solution and remove the solvents in vacuo. Dissolve the resulting colorless oil in ether and allow to stand to crystallize. Filter the prismatic needles to yield 3.51 g. of the title product; M.P. 118–121°;

$\lambda_{max.}^{KBr}$ 5.75μ; $\lambda_{max.}^{EtOH}$ 235 mμ (ε 13,100)

*Analysis.*—Calculated for $C_{21}H_{26}O_4$ (percent): C, 73.66; H, 7.66. Found (percent): C, 73.72; H, 7.33.

EXAMPLE 33

(±)-3-methoxyestra-1,3,5(10),9(11)-tetraene-8,17β-diol, 17-acetate

Stir a solution of (±)-3-methoxy-8,9-epoxyestra-1,3,5(10)-trien-17β-ol, acetate (4.00 g.) and benzoic acid (2.0 g.) in chloroform (150 ml.) for 18 hours. Remove the solvent in vacuo and dissolve the residue in ethyl acetate. Wash the extract well with 5% potassium carbonate solution, with water and with saturated sodium chloride solution and dry over anhydrous sodium sulfate. Filter the solution and remove the solvent in vacuo. Triturate the resulting oil with ether. Filter the white crystalline solid to afford 3.37 g. of the title product; M.P. 174–176°;

$\lambda_{max.}^{KBr}$ 2.86 and 5.83 and 6.12μ; $\lambda_{max.}^{EtOH}$ 258 mμ (ε 17,600)

*Analysis.*—Calculated for $C_{21}H_{26}O_4$ (percent): C, 73.66; H, 7.66. Found (percent): C, 73.35; H, 7.69.

EXAMPLE 34

(±)-3-methoxyestra-1,3,5(10)-triene-8,17β-diol, 17-acetate

Pretreat a mixture of 5% palladium on charcoal (1.0 g.) and ehtanol (50 ml.) with hydrogen at atmospheric pressure until saturation of the catalyst is complete. Add a solution of (±)-3-methoxyestra-1,3,5(10),9(11)-tetraene-8,17β-diol, 17-acetate (2.53 g.) in absolute ethanol (150 ml.) and tetrahydrofuran (50 ml.). Treat the solution with hydrogen until uptake of the gas is complete. Filter the mixture through Super-Cel and remove the solvent in vacuo. Dissolve the resulting oil in methylene chloride and treat with Nuchar charcoal. Filter the mixture through Super-Cel and remove the solvent in vacuo. Dissolve the resdue in benzene-hexane (1:1) and allow to stand to complete crystallization. Filter the resulting white crystalline solid to afford 1.83 g. of the title product, M.P. 143–144°;

$\lambda_{max.}^{KBr}$ 2.89 and 5.81μ

EXAMPLE 35

(±)-3-methoxyestra-1,3,5(10)-triene-8,17β-diol, 17-acetate

Allow a solution of (±)-3-methoxyestra-1,3,5(10)-triene-8,17β-diol (3.20 g.) in pyridine (15 ml.) and acetic anhydride (10 ml.) to stand at room temperature overnight. Pour the reaction into ice-water. Add a little ether to facilitate crystallization and blow it off with nitrogen. Filter the resulting white crystalline precipitate and dry. Dissolve the solid in methylene chloride, treat with Nuchar charcoal and filter through Super-Cel. Remove the methylene chloride in vacuo. Dissolve the resulting colorless oil in boiling hexane and add a small amount of benzene to remove cloudiness. Allow to stand at room temperature to deposit 2.71 g. of colorless prisms of the title product; M.P. 140.5–142.5°;

$\lambda_{max.}^{KBr}$ 2.89 and 5.80μ

*Analysis.*—Calculated for $C_{21}H_{28}O_4$ (percent): C, 73.22; H, 8.19. Found (percent): C, 73-17; H, 8.04.

EXAMPLE 36

(±)-3-methoxyestra-1,3,5(10),7-tetraen-17β-ol, acetate

To a solution of (±)-3-methoxyestra-1,3,5(10)-triene-8,17β-diol, 17-acetate (3.50 g.) in pyridine (25 ml.) add methane sulfonyl chloride (8 ml.). Heat the solution on a steam bath until a vigorous exothermic reaction causes reflux of the solvent, then remove the heat until the reaction subsides. Reapply the heat for a period of 15 minutes more to complete the reaction. Cool the reaction to room temperature then decompose with ice-water and ether. Blow the ether layer off with nitrogen and filter the resulting solid and air-dry. Dissolve the solid in methylene chloride, treat with Nuchar charcoal and filter through Super-Cel. Remove the solvent in vacuo and dissolve the yellow oil in methanol and allow to stand to complete crystallization. Filter the off-white crystalline precipitate to give 2.57 g. of the title product; M.P. 106–108°. Purify a sample (0.75 g.) of the product by dissolving it in benzene and passing the solution through a short column of Florex XXS. Evaporate the benzene eluent in vacuo and dissolve the resulting oil in methanol and allow to stand to crystallize. Filter the resulting fine white crystalline material to give 0.40 g. of the pure title product; M.P. 115–118°;

$\lambda_{max.}^{KBr}$ 5.75μ

*Analysis.*—Calculated for $C_{21}H_{26}O_3$ (percent): C, 77.27; H, 8.03. Found (percent): C, 76.97; H, 7.85.

EXAMPLE 37 d-3-methoxy-8,9-epoxyestra-1,3,5(10)-trien-17β-ol and d-(—)-3-methoxyestra-1,3,5(10),9(11)-tetraene-8,17β-diol Dissolve a sample of d-(—)-3-methoxyestra-1,3,5(10),8-tetraen-17β-ol (3.00 g.) in benzene (100 ml.) and hexane (25 ml.) and cool to 0° C. Add to the solution potassium carbonate (3.0 g.) and m-chloroperbenzoic acid (2.00 g.) and stir the mixture at 0° for 10 minutes. Quench the reaction by the addition of 5% potassium carbonate solution (250 ml.) and stir for a few minutes more at room temperature. Separate the layers and dilute the organic layer with ethyl acetate. Wash the extract with 5% potassium hydroxide solution, with water and with saturated sodium chloride solution, and dry over anhydrous sodium sulfate. Filter the solution and remove the solvents in vacuo to give the mixture of title products as a non-crystallizable oil. The oil is not further purified but is next converted to pure d-(—)-3-methoxyestra-1,3,5(10),9(11)-tetraen-8,17β-diol as described in Example 38.

EXAMPLE 38 d-(—)-3-methoxyestra-1,3,5(10),9(11)-tetraene-8,17β-diol

Dissolve the oily mixture from Example 37 and benzoic acid (2.00 g.) in chloroform (100 ml.) and stir the solution overnight at room temperature. Remove the solvent in vacuo and dissolve the residue in ethyl acetate. Wash the extract well with 5% potassium carbonate, with water and with saturated sodium chloride solution and dry over anhydrous sodium sulfate. Filter the solution and remove the solvent in vacuo. Dissolve the resulting oil in benzene and allow to stand to complete crystallization. Filter the resulting white crystalline product to give 2.08 g. of the title product; M.P. 130–132°;

$\lambda_{max.}^{KBr}$ 3.01 and 6.12μ; $\lambda_{max.}^{EtOH}$ 258.5 mμ (ε 16,350)

$[\alpha]_D^{26}$ = —15.7 (C=1.00; dioxane).

EXAMPLE 39 d(+)-3-methoxyestra-1,3,5(10)-triene-8,17β-diol

Preheat a mixture of 5% palladium on charcoal (1.00 g.) and ethanol (25 ml.) with hydrogen at atmospheric pressure until saturation of the catalyst is complete. Add a solution of d(—)-3-methoxyestra-1,3,5(10),9(11)-tetraene-8,17β-diol (1.98 g.) in absolute ethanol (100 ml.). Treat the solution with hydrogen until uptake of the gas is complete. Filter the mixture through Super-Cel and remove the solvent in vacuo. Dissolve the resulting oil in tetrahydrofuran, treat with Nuchar charcoal and filter through Super-Cel. Remove the solvent in vacuo and triturate the resulting residue with benzene and allow to stand to complete crystallization. Filter the white crystalline solid to give 1.70 g. of the title product; M.P. 146–148°;

$\lambda_{max.}^{KBr}$ 3.01μt $[\alpha]_D^{25}$ = +32° (C=1, dioxane).

*Analysis.*—Calculated for $C_{19}H_{26}O_3$ (percent): C, 75.46; H, 8.67. Found (percent): C, 75.62; H, 8.40.

EXAMPLE 40 d(+)-3-methoxyestra-1,3,5(10),7-tetraen-17β-ol, methane sulfonate

Add to a solution of d(+)-3-methoxyestra-1,3,5(10)-triene-8,17β-diol (1.50 g.) in pyridine (15 ml.), methane sulfonyl chloride (7 ml.). Heat the solution on a steam bath until a vigorous exothermic reaction causes reflux of the solvent, then remove the heat until the reaction subsides. Reapply the heat for a period of 15 minutes more to complete the reaction. Cool the reaction to room temperature and decompose with ice-water and ether. Blow off the ether layer with nitrogen and filter the resulting solid and air-dry. Dissolve the solid in methylene chloride, treat with Nuchar charcoal and filter through Super-Cel. Remove the solvent in vacuo and triturate the resulting oil with methanol. Filter the resulting light yellow crystalline material to give 1.38 g. of the title product; M.P. 150–152°; $[\alpha]_D^{24°} = +105°$ (C=1, dioxane).

EXAMPLE 41

(±)-3-methoxyestra-1,3,5(10),7-tetraen-17β-ol

Add a solution of (±)-3-methoxyestra-1,3,5(10),7-tetraen-17β-ol, methane sulfonate (1.00 g.) in tetrahydrofuran (25 ml.) dropwise to a stirred mixture of lithium aluminum hydride (1.00 g.) and tetrahydrofuran (25 ml.) under nitrogen. After complete addition (15 minutes) reflux the reaction under nitrogen for 2.5 hours. Cool the mixture to room temperature and decompose the reaction by the careful dropwise addition of ethyl acetate (15 ml.), water, then dilute acetic acid. Extract the mixture well with ethyl acetate and wash the extract with saturated sodium bicarbonate solution, with water and with saturated sodium chloride solution and dry over anhydrous sodium sulfate. Filter the solution and remove the solvent in vacuo. Dissolve the resulting oil in a small amount of ether, then add petroleum ether to cloudiness. Seed the solution and allow to stand to complete crystallization. Filter the resulting off-white prisms to give 0.54 g. of the title product; M.P. 121–124°;

$\lambda_{max.}^{KBr}$ 3.05μ

EXAMPLE 42

(±)-3-methoxyestra-1,3,5(10),7-tetraen-17β-ol

To a warm solution of sodium hydroxide (0.50 g.) in anhydrous methanol (20 ml.) add (±)-3-methoxyestra-1,3,5(10),7-tetraen-17β-ol, acetate (0.70 g.). Stir the mixture and warm until all of the solid goes into solution. Stir the reaction at room temperature for 0.5 hours. Dilute the solution with water and filter the resulting precipitate and air-dry. Dissolve the solid in methylene chloride, treat with Nuchar charcoal and filter through Super-Cel. Remove the solvent in vacuo and dissolve the resulting colorless oil in a small amount of benzene and then dilute with an equal volume of hexane. Seed the solution with authentic title compound and set aside to complete crystallization. Filter the resulting white needle clusters to give 0.37 g. of the title product; M.P. 126–128°;

$\lambda_{max.}^{KBr}$ 3.05μ

*Analysis.*—Calculated for $C_{19}H_{26}O_3$ (percent): C, 80.24; H, 8.51. Found (percent): C, 80.47; H, 8.59.

EXAMPLE 43

(±)-3-methoxyestra-1,3,5(10),7-tetraen-17β-ol

To a stirred mixture of (±)-3-methoxyestra-1,3,5(10),7-tetraen-17-one (2.08 g.) and methanol (50 ml.) add sodium borohydride (2.0 g.) in small portions over a period of one hour. After complete addition, stir the reaction at room temperature for one hour more then add water and seed the mixture with authentic title product. Filter the resulting precipitate and air-dry to give 2.00 g. of the title product; M.P. 121–124°.

EXAMPLE 44 d-(+)-3-methoxyestra-1,3,5(10),7-tetraen-17β-ol

Add a solution of d(+)-3-methoxyestra-1,3,5(10),7-tetraen-17β-ol, methane sulfonate (1.30 g.) in tetrahydrofuran (25 ml.) dropwise to a stirred mixture of lithium aluminum hydride (1.30 g.) and tetrahydrofuran (25 ml.) under nitrogen. After complete addition (15 minutes) reflux the reaction under nitrogen for 2.5 hours. Cool the mixture to room temperature and decompose the reaction by the careful addition of ethyl acetate, water and dilute acetic acid. Extract the mixture well with ethyl acetate tnd wash he extract with saturated sodium bicarbonate solution, with water and with saturated sodium chloride solution and dry over anhydrous sodium sulfate. Filter the solution and remove the solvent in vacuo. Cool the resulting oil and scratch to give a partially crystalline solid. Set a seed aside, and dissolve the product in a small volume of benzene and pass the solution through a short column of Florex XXS. Evaporate the benzene eluent in vacuo. Dissolve the resulting colorless oil in a small amount of benzene, dilute with hexane and add the seed to initiate crystallization. Filter the resulting white feathery crystals to give 0.71 g.; M.P. 80–82°;

$\lambda_{max.}^{KBr}$ 3.05μ

$[\alpha]_D = +168°$ (C=1; dioxane). Second crops are obtained from the above mother liquors as a white crystalline solid, 170 mg. with M.P. 79–82°.

EXAMPLE 45

(±)-3-hydroxy-8,9-epoxyestra-1,3,5(10)-trien-17-one, acetate

Dissolve (±) - 3 - hydroxyestra-1,3,5(10),8-tetraen-17-one, acetate (6.00 g.) in benzene (125 ml.) and hexane (35 ml.) and cool the solution to 0° C. Add the potassium carbonate (6.00 g.) and m-chloroperbenzoic acid (4.0 g.) to the solution and continue stirring for two hours. Quench the reaction with 5% potassium carbonate solution (250 ml.), stir a few minutes, then separate the layers. Wash the organic layer with 5% sodium hydroxide solution, with water and with saturated sodium chloride solution, then dry the extract over anhydrous sodium sulfate. Filter the solution and remove the solvents in vacuo to get a red oil. Dissolve the oil in ether and allow it to stand to crystallize. Filter the resulting orange prism clusters to give 3.88 g. of the title product; M.P. 155–160°. Further purify a sample (0.48 g.) by recrystallization from methanol to give 0.33 g. of slightly orange platelets; M.P. 166–169°;

$\lambda_{max.}^{KBr}$ 5.75μ; $\lambda_{max.}^{EtOH}$ 228 mμ (ε 10,100);

*Analysis.*—Calculated for $C_{20}H_{22}O_4$ (percent): C, 73.60; H, 6.79. Found (percent): C, 73.07; H, 6.48.

EXAMPLE 46

(±)-3-hydroxy-8,9-epoxyestra-1,3,5(10)-trien-17-one

Dissolve a sample of (±)-3-hydroxy-8,9-epoxyestra-1,3,5(10)-trien-17-one, acetate (0.326 g.) in a solution of sodium methoxide (0.090 g.) in methanol (10 ml.). Stir the solution for 10 minutes, then remove the methanol in vacuo. Add water (100 ml.) to the residue, then add solid ammonium chloride in small portions until the mixture is nearly neutral. Extract the mixture with methylene chloride and dry it over anhydrous sodium sulfate. Filter the extract and remove the solvent in vacuo to give a dark oil. Cover the oil with benzene and let it stand to crystallize. Filter the resulting dark crystalline solid to get 0.150 g. of the title product, M.P. 182–185°;

$\lambda_{max.}^{KBr}$ 3.05 and 5.80μ; $\lambda_{max.}^{EtOH}$ 223 mμ (ε 7,300)

EXAMPLE 47

(±)-estra-1,3,5(10),8-tetraene-3,17β-diol

To a flask containing (±)-3-methoxyestra-1,3,5(10),8-tetraen-17β-ol (24.0 g.), add a 3 M ethereal solution of methyl magnesium iodide (350 ml.) and heat the reaction, under an atmosphere of argon, to an oil bath temperature of 160° C. Keep the bath at this temperature for 5 hours, then allow the reaction to cool. Cover the reaction with a layer of white mineral oil, then further cool the mixture by immersion in a methanol-ice bath. Decompose the reaction mixture by the addition of ice-water and vigorous mechanical stirring. Acidify the solution with dilute acetic acid, then filter, wash with petroleum ether and air-dry the resulting yellow solid. Dissolve the solid in boiling methanol-ethyl acetate, treat with Nuchar charcoal and filter the solution hot through Super-Cell. Boil the filtrate to remove methanol, then allow the solution to stand at −10° C. to complete crystallization.

Filter the resulting yellow crystals to give 12.5 g. of the title product; M.P. 218–221°;

$\lambda_{max.}^{KBr}$ 2.90 and 3.15μ; $\lambda_{max.}^{EtOH}$ 272 mμ (ε 14,115)

Further purify a sample (0.37 g.) by dissolving in methanol, treating with Nuchar charcoal, filtering through Super-Cel and replacing the methanol with ethyl acetate by boiling on the steam bath.

Filter the resulting off-white prisms to give 0.20 g. of the pure title product; M.P. 215–217°;

$\lambda_{max.}^{KBr}$ 2.90 and 3.17μ; $\lambda_{max.}^{EtOH}$ 275 mμ (ε 16,200)

Analysis.—Calculated for $C_{18}H_{22}O_2$ (percent): C, 79.96; H, 8.20. Found (percent): C, 79.62; H, 8.16.

EXAMPLE 48

(±)-estra-1,3,5(10),8-tetraene-3,17β-diol, diacetate

Dissolve (±) - estra - 1,3,5(10),8-tetraene-3,17β-diol in pyridine (12.0 ml.) and acetic anhydride (6.0 ml.) and allow the solution to stand at room temperature overnight. Pour the reaction mixture into water, then filter and air-dry the resulting white precipitate. Dissolve the solid in methylene chloride, treat with Nuchar charcoal and filter through Super-Cel. Remove the solvent in vacuo and dissolve the resulting oil in methanol. Let the solution stand to complete crystallization. Filter the white crystalline solid to afford 2.83 g. of the title product; M.P. 140–142°;

$\lambda_{max.}^{KBr}$ 5.66 and 5.77μ; $\lambda_{max.}^{EtOH}$ 273 mμ (ε 13,200)

Analysis.—Calculated for $C_{22}H_{26}O_4$ (percent): C, 74.55; H, 7.39. Found (percent): C. 74.14; H, 7.39.

EXAMPLE 49

(±)-8,9-epoxyestra-1,3,5(10)-triene-3,17β-diol, diacetate

Dissolve a sample of (±)-estra-1,3,5(10),8-tetraene-3,17β-diol, diacetate (2.10 g.) in benzene (50 ml.) and hexane (15 ml.) and cool the solution to 0° C. Add anhydrous potassium carbonate (2.10 g.) and m-chloroperbenzoic acid (1.50 g.) to the solution. Stir the reaction for two hours, then quench with 5% potassium carbonate solution (150 ml.) and continue stirring a few minutes longer. Separate the layers and dilute the organic layer with ethyl acetate. Wash the extract with 5% sodium hydroxide solution, with water and with saturated sodium chloride solution, then dry over anhydrous sodium sulfate. Filter the mixture and remove the solvents in vacuo. Dissolve the resulting oil in ether and let stand to crystallize. Filter the resulting solid to obtain the title product.

EXAMPLE 50

(±)-estra-1,3,5(10),7-tetraene-3,17β-diol

Add (±) - 3 - methoxyestra-1,3,5(10),7-tetraen-17β-ol (2.00 g.) to a 3 molar ethereal solution of methylmagnesium bromide (70 ml.) and under argon heat the reaction in an oil bath to a bath temperature of 185° C. Keep the reaction at this temperature for 1.5 hours, then allow it to cool to room temperature. Further cool the reaction in an ice-salt bath and quickly quench the solid with ice-water. Acidify the mixture to pH 7 with 5% hydrochloric acid. Filter the resulting yellow solid and air-dry. Dissolve the solid in tetrahydrofuran, treat with Nuchar charcoal and filter through Super-Cel. Remove the solvent in vacuo and dissolve the resulting yellow oil in methylene chloride. Filter the resulting yellow solid to afford 0.95 g. of the title product; M.P. 210–213°. Further purify a sample (0.35 g.) by dissolving it in methanol, adding Nuchar charcoal and boiling, then filtering the solution through Super-Cel. Replace the methanol with ethyl acetate by boiling on the steam bath, then let the solution stand to crystallize. Filter the white, leafy crystals to give 0.20 g. of the pure title product; M.P. 220–222°;

$\lambda_{max.}^{KBr}$ 2.95 and 3.20μ

Analysis.—Calculated. for $C_{18}H_{22}O_2$ (percent): C, 79.96; H, 8.20. Found (percent): C, 79.68; H, 8.13.

EXAMPLE 51

(±)-3-hydroxyestra-1,3,5(10),7-tetraen-17-one

Dissolve (±) - 3 - estra-1,3,5(10),7-tetraen-3,17β-diol (200 mg.) in methyl ethyl ketone (20 ml.) and benzene (30 ml.) and reflux the solution under nitrogen into a water separator. To the reaction add a solution of aluminum isopropoxide (1.0 g.) in dry benzene (10 ml.) and continue refluxing for 2 hours. Recharge the reaction with another solution of aluminum isopropoxide (1.0 g.) in dry benzene (10 ml.) and continue refluxing for 4 hrs. more. Let the reaction cool and stand overnight. Decompose the reaction by adding water, then dilute acetic acid to pH 7. Extract the mixture well with ethyl acetate, wash with water and with saturated sodium chloride solution, then dry over anhydrous sodium sulfate. Filter the solution and remove the solvent in vacuo to give a partially crystalline oil. Triturate with ether and filter the yellow prisms to give 98 mg. of the title product; M.P. 213–216°;

$\lambda_{max.}^{KBr}$ 3.00 and 5.80μ a solution I.R. spectrum (THF) and NMR spectrum (CDCl₃) of the sample is identical to the corresponding spectra of the natural product, equilin.

EXAMPLE 52 d(+)-estra-1,3,5(10),7-tetraene-3,17β-diol

Add a 3 M ethereal solution of methylmagnesium iodide (30 ml.) to a flask containing d(+)-3-methoxyestra-1,3,5(10),7-tetraen-17β-ol (0.80 g.) and under an atmosphere of argon heat the reaction to an oil bath temperature of 160° C. Keep the reaction at this temperature for 2 hours, then allow it to cool to room temperature. Cool the flask further by immersion in a methanol-ice bath, then quickly quench by addition of ice-water followed by acidification to pH 7 with dilute acetic acid. Filter and air-dry the resulting yellow solid. Dissolve the solid in tetrahydrofuran, treat with Nuchar charcoal, filter through Super-Cel, then remove the solvent in vacuo. Dissolve the resulting yellow oil in a small amount of methylene chloride to promote crystallization, then dilute with ether. Filter the yellow crystalline solid to obtain, in two crops, 0.40 g. of the title product; M.P. 200–203° with presoften at 165°. Further purify a sample (210 mg.) by recrystallization from boiling 30% ethanol. Allow to stand to deposit 160 mg. of the title product as long off-white needles; M.P. 200–203° (dry at 80° vacuum);

$\lambda_{max.}^{KBr}$ 3.01 and 3.16μ

EXAMPLE 53 d(+)-3-hydroxyestra-1,3,5(10),7-tetraen-17-one (equilin)

Dissolve d(+) - estra - 1,3,5(10),7-tetraene-3,17β-diol (300 mg.) in methyl ethyl ketone (25 ml.) and benzene (35 ml.) and reflux the solution under nitrogen into a water separator. To the reaction add a solution of aluminum isopropoxide (1.0 g.) in dry benzene (10 ml.) and continue refluxing for 2 hours. Recharge the reaction with another solution of aluminum isopropoxide (1.0 g.) in dry benzene (10 ml.) and continue refluxing for 4 hours more. Let the reaction cool and stand overnight. Decompose the reaction by adding water, then dilute acetic acid to pH 7. Extract the mixture well with ethyl acetate and wash with water and with saturated sodium chloride solution, then dry over anhydrous sodium sulfate. Filter the solution and remove the solvents in vacuo. Triturate the residue with ether and filter the resulting solid to obtain the title product.

EXAMPLE 54

(±)-estra-1,3,5(10)-triene-3,8,17β-triol

Add a 3 M ethereal solution of methylmagnesium bromide (100 ml.) to a flask containing (±)-3-methoxyestra-1,3,5(10)-triene-8,17β-diol (4.00 g.) and heat the reaction, under argon, to an oil bath temperature of 185° C. Keep the bath at this temperature for 1.5 hours, then allow the reaction to cool. Further cool the flask by immersion in an ice-salt bath, then quickly quench the reaction by the addition of ice-water followed by acidification to pH 7 with dilute hydrochloric acid. Filter and air-dry the yellow solid. Dissolve the yellow solid in tetrahydrofuran, treat with Nuchar charcoal and filter through Super-Cel. Remove the solvent in vacuo to a dark oil. Dissolve the residue in methylene chloride, cool the flask and scratch with a glass rod to promote crystallization. Filter the resulting yellow prisms to afford 0.33 g. of the title product; M.P. 163–164°;

$\lambda_{max}^{KBr}$ 3.05 (broad OH)

Further purify a sample (300 mg.) by dissolving in methanol, treating with Nuchar charcoal and filtering through Super-Cel. Replace the methanol with ethyl acetate by boiling in the steam bath, then allow to stand to complete crystallization. Filter the white crystalline solid to give 130 mg. of the pure title product; M.P. 186–188° (dec.);

$\lambda_{max}^{KBr}$ 3.15μ (broad OH)

EXAMPLE 55

(±)-estra-1,3,5(10),7-tetraene-3,17β-diol, dimethanesulfonate

Dissolve (±)-estra-1,3,5(10)-trien-3,8,17β-triol (1.00 g.) in pyridine (12 ml.) and add methanesulfonyl chloride (5 ml.) to the solution. Heat the reaction on a steam bath until a vigorous exothermic reaction causes reflux of the solvent. Remove the heat until the reaction subsides, then heat again for 15 minutes longer to complete the reaction. Cool to room temperature, then decompose with water and ether. Blow off the ether under a stream of nitrogen, then filter and air-dry the resulting crystalline precipitate. Dissolve the precipitate in methylene chloride, treat with Nuchar charcoal and filter through Super-Cel. Remove the solvent in vacuo and triturate the residue with methanol. Filter the resulting solid to obtain the title product.

EXAMPLE 56

(±)-estra-1,3,5(10),7-tetraene-3,17β-diol

To a stirred mixture of lithium aluminum hydride (1.00 g.) in tetrahydrofuran (25 ml.) under nitrogen, add dropwise a solution of (±)-estra-1,3,5(10),7-tetraene-3,17β-diol, dimethanesulfonate (0.50 g.) in tetrahydrofuran. Reflux the reaction under nitrogen for 3 hours, then allow to cool to room temperature. Carefully decompose the reaction by the dropwise addition of ethyl acetate, water, then dilute acetic acid. Extract the mixture with ethyl acetate and wash the organic layer with saturated sodium bicarbonate solution, with water and with saturated sodium chloride solution, then dry over anhydrous sodium sulfate. Filter the solution and remove the solvent in vacuo. Triturate the residue with ether and filter the resulting solid to obtain the title product.

EXAMPLE 57

(±)-estra-1,3,5(10)-triene-3,8,17β-triol-3,17-diacetate

Dissolve a sample of (±)-estra-1,3,5(10)-triene-3,8,17β-triol (0.50 g.) in pyridine (5 ml.) and acetic anhydride (2 ml.) and allow to stand at room temperature overnight. Pour the reaction into water, filter and air dry the resulting crystalline solid. Dissolve the solid in tetrahydrofuran, treat with Nuchar charcoal, filter through Super-Cel and remove the solvent in vacuo. Triturate the residue with benzene-hexane and filter the resulting solid to obtain the title product.

EXAMPLE 58

(±)-estra-1,3,5(10),7-tetraene-3,17β-diol, diacetate

To a solution of (±)-estra-1,3,5(10)-triene-3,8,17β-triol, 3,17-diacetate (1.00 g.) in pyridine (12 ml.) add methanesulfonyl chloride (5 ml.). Heat the solution on a steam bath until a vigorous exothermic reaction causes reflux of the solvent. Remove the heat until the reaction subsides, then reheat for 15 minutes more to complete the reaction. Cool to room temperature and decompose the reaction with water and ether. Blow the ether off in a stream of nitrogen, then filter and air-dry the resulting solid. Dissolve the solid in methylene chloride, treat with Nuchar charcoal, filter through Super-Cel and remove the solvent in vacuo. Triturate the residue with methanol and filter to obtain the title product.

EXAMPLE 59

(±)-estra-1,3,5(10),7-tetraene-3,17β-diol

Dissolve (±)-estra-1,3,5(10),7-tetraene-3,17β-diol, diacetate (0.50 g.) in a solution of sodium hydroxide (0.40 g.) in methanol (10 ml.) and boil on the steam bath for 15 minutes. Let the solution cool, dilute with water and acidify to pH 7 with dilute acetic acid. Filter the resulting solid to obtain the title product.

EXAMPLE 60

(±)-3-methoxyestra-1,3,5(10),8-tetraen-17-one, ethylene ketal

To a prehydrogenated mixture of 2% palladium/calcium carbonate and benzene (100 ml.) add a solution of (±)-3-methoxyestra-1,3,5(10),8,14-pentane-17-one, ethylene ketal (29.0 g.) in benzene (300 ml.) and treat with hydrogen at one atmosphere until uptake of the gas is complete. Filter the solution through Super-Cel and remove the solvent in vacuo. Dissolve the residue in methylene chloride, treat with Nuchar charcoal and filter the solution through Super-Cel. Replace the solvent with ethanol by boiling then let stand at room temperature to complete crystallization. Filter the white plates of title product to obtain 17.0 g.; M.P. 130–132°. The analytical sample from ethanol had M.P. 132.5–134.0°;

$\lambda_{max}^{EtOH}$ 276 mμ (ε 17,200)

*Analysis.*—Calculated for $C_{21}H_{26}O_3$ (percent): C, 77.27; H, 8.03. Found (percent): C, 77.07; H, 8.00.

EXAMPLE 61

(±)-3-methoxy-8,9-epoxy-13-ethylgona-1,3,5(10)-trien-17β-ol

Dissolve (±)-3-methoxy-13-ethylgona-1,3,5(10),8-tetraen-17β-ol (10.00 g.) in benzene (300 ml.) and hexane (70 ml.) then cool the solution with an ice-bath. Add anhydrous potassium carbonate (10.0 g.) and m-chloroperbenzoic acid (8.0 g.) and stir the cooled mixture exactly five minutes. Quickly quench the reaction with 5% potassium carbonate solution (400 ml.), stir, then separate the layers. Dilute the organic layer with ethyl acetate, wash with water and saturated sodium chloride and dry over anhydrous sodium sulfate. Filter, evaporate the solvents in vacuo and dissolve the resulting oil in ether. The title product crystallizes on standing to give 8.40 g.; M.P. 140–145°;

$\lambda_{max}^{KBr}$ 2.94μ; $\lambda_{max}^{EtOH}$ 235 mμ (ε 12,300)

EXAMPLE 62

(±)-3-methoxy-8,9-epoxy-13-ethylgona-1,3,5(10)-trien-17β-ol

To a stirred mixture of (±)-3-methoxy-8,9-epoxy-13-ethylgona-1,3,5(10)-trien-17-one (1.82 g.) and methanol (100 ml.) add excess sodium borohydride in small portions over 2 hours. Then add water to completely precipitate the title product. Dry the solid to obtain 1.64 g.; M.P. 164–167°;

$\lambda_{max.}^{KBr}$ 2.92$\mu$; $\lambda_{max.}^{EtOH}$ 235 m$\mu$ ($\epsilon$ 13,000)

*Analysis.*—Calculated for $C_{20}H_{26}O_3$ (percent): C, 76.40; H, 8.34. Found (percent): C, 76.13; H, 8.08.

EXAMPLE 63

($\pm$) - 3 - methoxy - 8,9 - epoxy - 13 - ethylgona - 1,3,5 (10) - trien - 17$\beta$ - ol and ($\pm$) - 3 - methoxy - 13 - ethylgona - 1,3,5(10),9(11) - tetraene - 8,17$\beta$ - diol Dissolve ($\pm$) - 3 - methoxy - 13 - ethylgona - 1,3,5 (10),8-tetraen-17$\beta$-ol (50.0 g.) in benzene (600 ml.) and hexane (150 ml.) and cool the solution in an ice-bath. Add anhydrous potassium carbonate (50.0 g.) then m-chloroperbenzoic acid (40.0 g.) and stir the cool mixture exactly 6 minutes. Quickly quench the reaction by adding 5% potassium carbonate solution (600 ml.), stir then separate the layers. Dilute the organic layer with ethyl acetate, wash the extract with 5% sodium hydroxide, water and saturated sodium chloride solution then dry over anhydrous sodium sulfate. Filter, remove the solvents in vacuo and dissolve the residue in ether. Allow the solution to stand at 10° C. then filter to obtain 10.45 g. of ($\pm$) -3 - methoxy - 8,9 - epoxy - 13 - ethylgona - 1,3,5 (10)-trien-17$\beta$-ol; M.P. 130–134°. Dilute the filtrate with petroleum ether and filter to obtain 30.5 g. of ($\pm$)-3-methoxy - 13 - ethylgona - 1,3,5(10),9(11) - tetraene - 8,17$\beta$-diol; M.P.135–138°. Further purify a sample (3.35 g.) of this latter product by dissolving it in methylene chloride, treating with Nuchar charcoal and filtering through Super-Cel. Replace the solvent with isopropanol by boiling, let stand then filter to obtain 2.20 g. of pure ($\pm$) - 3 - methoxy - 13 - ethylgona - 1,3,5(10),9(11) - tetraene-8,17$\beta$-diol; M.P. 142–144°;

$\lambda_{max.}^{KBr}$ 3.0$\mu$; $\lambda_{max.}^{EtOH}$ 260 m$\mu$ ($\epsilon$ 17,700)

EXAMPLE 64

($\pm$)-3-methoxy-13-ethylgona-1,3,5(10),9(11)-tetraene-8,17$\beta$-diol

Dissolve ($\pm$) - 3 - methoxy - 8,9 - epoxy - 13 - ethyl-gona-1,3,5(10)-trien-17$\beta$-ol (8.00 g.) and benzoic acid (6.00 g.) in chloroform (150 ml.) and stir at room temperature overnight. Remove the chloroform in vacuo, dissolve the residue in ethyl acetate and wash the extract with 5% potassium carbonate solution, water, and saturated sodium chloride then dry over anhydrous sodium sulfate. Filter and remove the solvent in vacuo. Dissolve the oil in ether and let stand to complete crystallization. Filter to obtain 2.38 g. of the title product; M.P. 83–88° (solvate). Further purify the sample by treating a methylene chloride solution with Nuchar charcoal, filtering through Super-Cel then replacing the solvent with isopropanol-heptane by boiling. Filter the resulting solid to obtain 0.70 g. of pure title product; M.P. 142–144°;

$\lambda_{max.}^{KBr}$ 3.0$\mu$; $\lambda_{max.}^{EtOH}$ 260 m$\mu$ ($\epsilon$ 18,100)

*Analysis.*—Calculated for $C_{20}H_{26}O_3$ (percent): C, 76.40; H, 8.34. Found (percent). C, 76.17; H, 8.18.

EXAMPLE 65

($\pm$)-3-methoxy-13-ethylgona-1,3,5(10),9(11)-tetraene-8,17$\beta$-diol

Dissolve ($\pm$) - 3 - methoxy - 13 - ethylgona - 1,3,5 (10),8-tetraen-17$\beta$-ol (57.0 g.) in benzene (500 ml.) and hexane (100 ml.) and cool the solution to 10° (ice-bath). Add anhydrous potassium carbonate (50 g.) then m-chloroperbenzoic acid (40.8 g.) and stir the cooled mixture until the peracid is consumed (starch-iodide test.) Stir the mixture at room temperature for 1 hour then add water (1 liter) and extract the mixture with ethyl acetate. Wash the extract with 5% potassium carbonate, water and saturated sodium chloride solution then dry over anhydrous sodium sulfate. Filter, remove the solvents in vacuo and triturate the residue with methanolic-ether. Filter to obtain 50.5 g. of the title product; M.P. 85–88° (solvate).

EXAMPLE 66

$d(-)$-3-methoxyestra-1,3,5(10),9(11)-tetraene-8,17$\beta$-diol

Dissolve $d(-)$ - 3 - methoxyestra - 1,3,5(10),8-tetraen-17$\beta$-ol (60.0 g.) in benzene (1.2 liters) and add hexane (200 ml.). Cool the stirring solution in an ice-bath to 10° C. then add anhydrous potassium carbonate (50 g.) and m-chloroperbenzoic acid (43.0 g. of 85% assay). The temperature will rise to about 26° then drop again to 18° C. After 15 minutes a starch-iodide test will show that all of the peracid has been consumed. Remove the ice-bath and continue stirring at room temperature for 45 minutes. Quench the reaction with 5% potassium carbonate solution (1 liter) stir then filter the white crystalline solid and wash it with ethyl acetate and water then dry ($P_2O_5$-vacuum) to obtain 46.0 g. of the title product. Obtain a further 11.5 g. of the same product by separating the layers from the above mother liquors and washing the extract well with 5% sodium hydroxide solution, water and brine. Filter the dried ethyl acetate extract ($Na_2SO_4$) and remove the solvents in vacuo. Triturate the residue with benzene and store at 10° C. to obtain 11.5 g. of the title product. The combined product (57.5 g.; 90%) has M.P. 128–131°. The analytical sample (from benzene) had M.P. 134–136°; $[\alpha]_D^{25} = -22°$ (C=1, dioxane);

$\lambda_{max.}^{KBr}$ 3.0$\mu$; $\lambda_{max.}^{EtOH}$ 258 m$\mu$ ($\epsilon$ 16,540)

*Analysis.*—Calculated for $C_{19}H_{24}O_3$ (percent): C, 75.97; H, 8.07. Found (percent): C, 75.93; H, 8.19.

EXAMPLE 67

($\pm$)-3,8-dihydroxyestra-1,3,5(10),9(11)-tetraen-17-one

Cool a mixture of ($\pm$)-3-hydroxyestra-1,3,5(10),8-tetraen-17-one (3.45 g.), ethyl acetate (200 ml.) and tetrahydrofuran (30 ml.) in an ice bath. Add anhydrous potassium carbonate (3.0 g.) then m-chloroperbenzoic acid (2.78 g.) and stir the cooled solution for 0.5 hours. Remove the ice-bath and stir for 1 hour at room temperature then quench the reaction with saturated sodium bicarbonate solution (200 ml.). Separate the layers, wash the extract with 5% potassium carbonate, water and saturated sodium chloride then dry the extract over anhydrous sodium sulfate. Filter, evaporate the solvent in vacuo and dissolve the oil in methylene chloride. Dilute the solution with ether, filter and dry to obtain 1.50 g. of title product; M.P. 207–210°;

$\lambda_{max.}^{KBr}$ 3.0 and 5.8$\mu$; $\lambda_{max.}^{EtOH}$ 260 m$\mu$ ($\epsilon$ 14,600)

EXAMPLE 68

($\pm$)-estra-1,3,5(10),9(11)-tetraene-3,8,17$\beta$-triol

Dissolve ($\pm$)-estra-1,3,5(10),8 - tetraene - 3,17$\beta$ - diol (2.00 g.) in tetrahydrofuran (75 ml.) then cool the solution with an ice-bath. Add m-chloroperbenzoic acid (1.50 g.) and stir at room temperature for 1.25 hours. Quench the reaction by adding saturated sodium bicarbonate solution. Extract the mixture with ethyl acetate then wash the extract with saturated sodium bicarbonate and saturated sodium chloride solution and dry over anhydrous sodium sulfate. Filter, evaporate the solvent in vacuo and triturate the residue with methylene chloride. Filter to obtain the title product; M.P. 160–163° (solvate);

$\lambda_{max.}^{KBr}$ 3.0$\mu$; $\lambda_{max.}^{EtOH}$ 259 m$\mu$

EXAMPLE 69

($\pm$)-3-cyclopentyloxyestra-1,3,5(10),9(11)-tetraene-8,17$\beta$-diol

Dissolve ($\pm$)-3-cyclopentyloxyestra-1,3,5(10),8-tetraen-17$\beta$-ol (3.00 g.) in benzene (75 ml.) and hexane (20 ml.) and cool the solution in an ice-bath. Add anhydrous potassium carbonate (3.0 g.) and m-chloroperbenzoic acid (1.80 g.) and stir the cooled reaction mixture for ½ hour. Remove the ice-bath and stir at room temperature for 2 hours then quench the reaction with 5% potassium carbonate solution (100 ml.). Dilute the mixture with ethyl acetate, separate the layers and wash the extract well with 5% potassium carbonate, water and saturated sodium chloride solution then dry over anhydrous sodium sulfate. Filter, remove the solvents in vacuo and dissolve the oil in ether. Scratch to induce crystallization, triturate and filter to obtain 1.36 g. of title product; M.P. 140–142°. Further purify the product by dissolving it in tetrahydrofuran, treating with Nuchar charcoal and filtering through Super-Cel. Remove the solvent in vacuo, dissolve the oil in ether, seed and let stand to crystallize. Filter to obtain 0.70 g. of pure title product; M.P. 144–146°;

$\lambda_{max.}^{KBr}$ 3.03μ; $\lambda_{max.}^{EtOH}$ 260 mμ (ε 18,400)

*Analysis.*—Calculated for $C_{23}H_{30}O_3$ (percent): C, 77.93; H, 8.53. Found (percent): C, 77.93; H, 8.49.

EXAMPLE 70

(±)-8,9-epoxyestra-1,3,5(10)-triene-3,17β-diol, diacetate

Dissolve (±)-estra-1,3,5(10),8-tetraene-3,17β-diol, diacetate (2.10 g.) in benzene (50 ml.) and hexane (15 ml.) and cool the solution in an ice-bath. Add potassium carbonate (2.10 g.) and m-chloroperbenzoic acid (1.50 g.) and stir for 2 hours. Quench with 5% potassium carbonate solution, stir then separate the layers. Dilute with ethyl acetate, wash the extract with 5% sodium hydroxide, water and saturated sodium chloride then dry over anhydrous sodium sulfate. Filter, evaporate the solvents in vacuo and dissolve the oil in methanol allowing the solution to stand to complete crystallization. Filter to obtain 1.29 g. of the title product as tiny feathery needles; M.P. 141–143°;

$\lambda_{max.}^{KBr}$ 5.66 and 5.78μ; $\lambda_{max.}^{EtOH}$ 229.5 mμ (ε 13,000)

*Analysis.*—Calculated for $C_{22}H_{26}O_5$ (percent): C, 71.33; H, 7.08. Found (percent): C, 71.75; H, 7.23.

EXAMPLE 71

(±)-3,8-dihydroxyestra-1,3,5(10),9(11)-tetraen-17-one, 3-acetate

Dissolve (±)-8,9-epoxy - 3 - hydroxyestra - 1,3,5(10)-trien-17-one, acetate (250 mg.) and 2,4-dinitrobenzoic acid (250 mg.) in chloroform (20 ml.) and stand the solution at room temperature overnight. Remove the solvent in vacuo and dissolve the residue in ethyl acetate. Wash the extract with saturated sodium bicarbonate solution, water and saturated sodium chloride solution then dry over anhydrous sodium sulfate. Filter and evaporate the solvent to obtain the title product;

$\lambda_{max.}^{KBr}$ 2.95, 5.67 and 5.75μ; $\lambda_{max.}^{EtOH}$ 252 mμ (ε 13,500)

EXAMPLE 72

(±3-methoxy-13-ethylgona-1,3,5(10),8-tetraen-17β-ol and (±)-3-methoxy-13-ethylgona-1,3,5(10)-trien-17β-ol To a solution of tetrahydrofuran (15 ml.) and aniline (1.5 ml.) in liquid ammonia (200 ml.) add a solution of (±)-3-methoxy-8,9-epoxy-13-ethylgona-1,3,5(10) - trien-17β-ol (629 mg.) in tetrahydrofuran (15 ml.). With stirring add lithium metal (32 mg.), stir then add 10 mg. more of lithium. Add ammonium chloride (3 g.) then water to evaporate the ammonia. Filter the resulting solid then dissolve it in methylene chloride, treat with Nuchar charcoal, filter through Super-Cel and remove the solvent in vacuo. Dissolve the residue in a small amount of ether then dilute with petroleum ether. Filter the resulting solid to obtain 350 mg. of the mixture of title product; M.P. 121–124°.

EXAMPLE 73

(±)-3-methoxyestra-1,3,5(10)-trien-17β-ol

To a solution of tetrahydrofuran (100 ml.) and aniline (20 ml.) in liquid ammonia (500 ml.) add a solution of (±)-3-methoxyestra-1,3,5(10),9(11)-tetraene - 8,17β-diol (3.00 g.) in tetrahydrofuran (50 ml.). Add lithium metal (0.140 g.) and stir for 1.5 hours then add a small piece of lithium until an excess is present as shown by a permanent blue color. Quench the reaction by adding solid ammonium chloride to destroy the blue color then add water and extract the mixture with ether. Wash the extract with water, dilute hydrochloric acid, water and saturated sodium chloride solution then dry the extract over anhydrous sodium sulfate. Filter, remove the solvent in vacuo and triturate the residue with ether. Filter the white solid to obtain 1.57 g. of the title product; M.P. 135–137°.

EXAMPLE 74

(±)-3-methoxy-13-ethylgona-1,3,5(10)-triene-8,17β-diol

Add (±) - 3 - methoxy -8,9 - epoxy - 13 - ethylgona-1,3,5(10)-trien-17-one (1.00 g.) to a mixture of lithium aluminum hydride (2.0 g.) and tetrahydrofuran (60 ml.) and reflux the reaction for 20 hours. Cool to room temperature then decompose the reaction by the careful dropwise addition of ethyl acetate, then water followed by dilute hydrochloric acid. Extract the mixture with ethyl acetate and wash the extract with water, saturated sodium chloride, then dry the extract over anhydrous sodium sulfate. Filter, remove the solvent in vacuo and dissolve the resulting oil in ether. Filter the solid to obtain 0.11 g. of the title product; M.P. 191–194°.

EXAMPLE 75

(±)-3-methoxy-2-ethylgona-1,3,5(10)-triene-8,17β-diol

Add (±) - 3 - methoxy - 8,9 - epoxy - 13 - ethylgona-1,3,5(10)-trien-17β-ol (1.00 g.) to a mixture of lithium aluminum hydride (2.00 g.) and tetrahydrofuran (60 ml.) and reflux the reaction for 20 hours. Cool to room temperature then decompose the reaction by the careful dropwise addition of ethyl acetate, then water followed by dilute hydrochloric acid. Extract the mixture with ethyl acetate and wash the extract with water, saturated sodium chloride solution then dry the extract over anhydrous sodium sulfate. Filter, remove the solvent in vacuo and dissolve the resulting oil in ether. Filter the solid to obtain 0.12 g. of the title product; M.P. 191–194°.

EXAMPLE 76

(±)-3-methoxy-13-ethylgona-1,3,5(10)-triene-8,17β-diol

Add a solution of (±) - 3 - methoxy - 13 - ethylgona-1,3,5(10),9(11)-tetraene-8,17β-diol (27.00 g.) in ethanol (250 ml.) to a pre-hydrogenated mixture of 5% palladium on carbon (10.0 g.) and ethanol (100 ml.) and react the mixture with hydrogen at one atmosphere until uptake of the gas is complete. Filter the mixture through Super-Cel and remove the solvent in vacuo. Dissolve the residue in warm tetrahydrofuran, treat with Nuchar charcoal and filter through Super-Cel. Remove the solvent in vacuo and triturate the residue with ether. Filter to obtain 20.0 g. of the title product; M.P. 202–204°;

$\lambda_{max.}^{KBr}$ 2.96μ

*Analysis.*—Calculated for $C_{20}H_{28}O_3$ (percent): C, 75.91; H, 8.92. Found (percent): C, 75.86; H, 8.68.

EXAMPLE 77

(±)-3,8-dihydroxyestra-1,3,5(10)-trien-17-one

Add a solution of (±) - 3,8-dihydroxyestra-1,3,5(10),9(11)-tetraen-17-one (1.00 g.) in ethanol (50 ml.) to a prehydrogenated mixture of 5% palladium on carbon (0.50 g.) and tetrahydrofuran (20 ml.). Treat the mixture with hydrogen at one atmosphere until uptake of the gas is complete. Filter the solution through Super-Cel, remove the solvents in vacuo and dissolve the residue in tetrahydrofuran. Treat with Nuchar charcoal, filter through Super-Cel and remove the solvent in vacuo. Dissolve the resulting oil in methylene chloride. Filter the resulting prisms to obtain 0.80 g. of the title product; M.P. 230–233°;

$\lambda_{max}^{KBr}$ 2.94, 3.13 and 5.80μ

EXAMPLE 78

(±)-estra-1,3,5(10)-triene-3,8,17β-triol

Add a solution of (±)-estra-1,3,5(10),9(11)-tetraene-3,8,17β-triol (4.1 g.) in ethanol (200 ml.) to a prehydrogenated mixture of 5% palladium on carbon (1.0 g.) and ethanol (50 ml.). Continue treating with hydrogen until uptake of the gas is complete. Filter the mixture through Super-Cel, remove the solvent in vacuo and dissolve the residue in tetrahydrofuran. Treat the solution with Nuchar charcoal, filter through Super-Cel and remove the tetrahydrofuran in vacuo. Boil the residue with chloroform, cool and filter to get 1.86 g. of impure title product; M.P. 219–222°.

EXAMPLE 79

(±)-estra-1,3,5(10)-triene-3,8,17β-triol

Cool a solution of (±)-estra-1,3,5(10),8-tetraene-3,17β-diol (10.0 g.) in tetrahydrofuran (150 ml.) with an ice-bath then add m-chloroperbenzoic acid (7.5 g.), stir and remove the ice-bath. Continue stirring at room temperature for 1.5 hours. Quench the reaction by adding saturated sodium bicarbonate solution (200 ml.) and extract the mixture with ethyl acetate. Wash the extract with saturated sodium bicarbonate, water and saturated sodium chloride solution then dry over anhydrous sodium sulfate. Filter, remove the solvent in vacuo and dissolve the oil in ethanol (150 ml.). Add the solution to a prehydrogenated mixture of 5% palladium on carbon (3.0 g.) and ethanol (50 ml.) and continue treating with hydrogen until uptake of the gas is complete. Filter the mixture through Super-Cel, evaporate the solvent in vacuo and dissolve the residue in boiling methanolic-tetrahydrofuran. Treat the hot solution with Nuchar charcoal, filter through Super-Cel and remove the solvents in vacuo. Boil the residue with chloroform containing a small amount of tetrahydrofuran then allow to cool to fully crystallize. Filter to obtain 8.0 g. of the title product; M.P. 255–258°.

EXAMPLE 80 d(+)-3-methoxyestra-1,3,5(10)-triene-8,17β-diol

Pretreat a mixture of 5% palladium on charcoal (10.0 g.) and ethanol (100 ml.) with hydrogen at one atmosphere until the catalyst is saturated. Add to the mixture a solution d(−)-3-methoxyestra-1,3,5(10),9(11)-tetraen-8,17β-diol, (30.0 g.) in ethanol (750 ml.) and continue to treat with hydrogen until uptake of the gas is complete (2500 ml.). Filter the mixture through Super-Cel. Remove the solvent in vacuo. Dissolve the residue in THF and treat with Nuchar charcoal. Filter through Super-Cel and remove the solvent in vacuo. Triturate the residue with benzene and let stand to complete crystallization. Filter the white crystalline solid to obtain, in several crops, 26.7 g. of d(+)-3-methoxy-estra-1,3,5(10)-trien-8,17β-diol, M.P. 148–152°. The analytical sample (from benzene) had a M.P. 146–148°; [α]$_D^{25}$=+32° (C=1, dioxane);

$\lambda_{max}^{KBr}$ 3.0μ

Analysis.—Calculated for $C_{19}H_{26}O_3$ (percent): C, 75.46; H, 8.67. Found (percent): C, 75.62; H, 8.40.

EXAMPLE 81

(±)-3-methoxyestra-1,3,5(10),7-tetraen-17-one

Dissolve (±)-3-methoxy-8-hydroxyestra - 1,3,5(10)-trien-17-one (1.00 g.) in dimethylformamide (10 ml.) and pyridine (5 ml.) then methanesulfonyl chloride (2 ml.). Quickly warm the solution to 85–90° (under argon) and keep the reaction at this temperature for 10 minutes. Cool and pour the reaction into water. Filter and air-dry the precipitate then dissolve the solid in benzene. Pass the solution through a short column of Florex XXS, remove the benzene in vacuo and crystallize the product from 95% ethanol. Filter to obtain 0.70 g.; M.P. 125–128°. Further purify a sample (0.60 g.) by dissolving it in ether and passing the solution through a column of 10% silver nitrite-impregnated alumina. Remove the solvent in vacuo and crystallize the residue from 95% ethanol to obtain 0.46 g. of the title product; M.P. 129–132°.

EXAMPLE 82

(±)-3-methoxyestra-1,3,5(10),7-tetraen-17β-ol, formate

Dissolve (±) - 3-methoxyestra-1,3,5(10)-triene-8,17β-diol (5.00 g.) in dimethylformamide (60 ml.) and pyridine (14 ml.) then add methanesulfonyl chloride (8 ml.) and heat the solution under argon to 85° for 15 minutes. Cool and pour the reaction into water. Filter and air-dry the resulting solid then dissolve it in benzene. Pass the solution through a short column of Florex XXS then through 10% silver nitrate-impregnated alumina. Remove the solvent in vacuo and crystallize to obtain 3.27 g. of the title product; M.P. 120–122°. Further purify a sample (1.00 g.) by treating a methylene chloride solution with Nuchar charcoal, filtering (Super-Cel) and replacing the methylene chloride with isopropanol by boiling. Filter the resulting white crystalline solid to get 0.86 g. of pure title product; M.P. 123–125°;

$\lambda_{max}^{KBr}$ 5.80μ

Analysis.—Calculated for $C_{20}H_{24}O_3$ (percent): C, 76.89; H, 7.74. Found (percent): C, 76.69; H, 7.57.

EXAMPLE 83

(±)-3-methoxy-13-ethylgona-1,3,5(10),7-tetraen-17β-ol formate

Dissolve (±)-3-methoxy-13-ethylgona-1,3,5(10)-trien-8,17β-diol (5.00 g.) in dimethylformamide (55 ml.) and pyridine (10 ml.) then add methanesulfonyl chloride (6 ml.). Heat the solution to 95° for 30 minutes then cool and pour the reaction into water. Filter and air-dry the resulting solid and dissolve it in benzene. Pass the solution through a column of Florex XXS, remove the solvent in vacuo and crystallize the residue from methanol. Filter to get 2.73 g. of title product; M.P. 111–114°. Further purify a sample (2.65 g.) by passing its benzene solution through a column of 10% silver nitrate-impregnated alumina, removing the solvent in vacuo and crystallizing the residue from thanol. Filter to get 1.83 g. of pure title product; M.P. 117–118°;

$\lambda_{max}^{KBr}$ 5.85μ

Analysis.—Calculated for $C_{21}H_{26}O_3$ (percent): C, 77.27; H, 8.03. Found (percent): C, 77.45; H, 7.70.

EXAMPLE 84 d(+)-3-methoxyestra-1,3,5(10),7-tetraen-17β-ol formate

Dissolve d(+) - 3-methoxyestra-1,3,5(10)-trien-8,17β-diol (23.5 g.) in dimethylformamide (320 ml.). To the solution add pyridine (64 ml.) and methanesulfonyl chloride (40 ml.) and under argon (or other inert gas) heat the reaction quickly to 85°. Keep the reaction at 85° for 10 minutes then quickly cool to room temperature. Decompose the reaction by pouring it into ice-water. Filter and dry the crystalline precipitate. Dissolve the solid in benzene (warming is necessary) and pass the solution through a short column which consists of an upper layer of Florex XXS and a lower layer of 10% silver nitrate-impregnated alumina. Remove the benzene in vacuo and dissolve the resulting oil in 95% ethanol (warm). Allow the solution to stand to fully crystallize. Filter the resulting white crystalline solid to obtain 18.0 g. of d(+)-3-methoxyestra-1,3,5(10),7-tetraen-17β-ol, formate; M.P.

147–150°; the analytical sample (from 95% ethanol) had M.P. 154–156°; $[\alpha]_D^{24}+133°$ (C=1, dioxane);

$\lambda_{max.}^{KBr.}$ 5.86μ; $\lambda_{max.}^{EtOH}$ 222 mμ (inf.; ε 8,260)

*Analysis.*—Calculated for $C_{20}H_{24}O_3$ (percent): C, 76.89; H, 7.74. Found (percent): C, 76.74; H, 7.70.

EXAMPLE 85

(±)-3-methoxyestra-1,3,5(10),7-tetraen-17β-ol

To a solution of sodium hydroxide (0.60 g.) in methanol (75 ml.) add (±)-3-methoxyestra-1,3,5(10),1-tetraen-17β-ol, formate (2.18 g.). Warm the mixture briefly on the steam bath then stir the solution for ½ hour at room temperature. Add water (150 ml.) dropwise to the stirred solution to completely precipitate the product. Filter and dry the white solid then treat a methylene chloride solution with Nuchar charcoal, filter through Super-Cel and replace the solvent with isopropanol by boiling. Let stand to complete crystallization. Filter to obtain 1.18 g. of the pure title product; M.P. 124–126°;

$\lambda_{max.}^{KBr}$ 3.02

EXAMPLE 86

(±)-3-methoxy-13-ethylgona-1,3,5(10),7-tetraen-17β-ol

To a solution of sodium hydroxide (1.3 g.) in methanol (100 ml.) and (±)-3-methoxy-13-ethylgona-1,3,5(10),7-tetraen-17β-ol, formate (4.24 g.). Warm the mixture briefly on a steam bath then stir at room temperature for 1 hour. Add water (250 ml.) dropwise to completely precipitate the product. Filter and dry the solid to get 3.85 g. of title product; M.P. 133–137°.

EXAMPLE 87

(±)-3-methoxy-13-ethylgona-1,3,5(10),7-tetraen-17β-ol

To a stirred mixture of (±)-3-methoxy-13-ethylgona-1,3,5(10),7-tetraen-17-one (1.00 g.) and methanol (50 ml.) add sodium borohydride (1.0 g.) in small portions over 2 hours. Stir for 1 hour more then add water, filter and air-dry the resulting solid. Further purify the product by treating its methylene chloride solution with Nuchar charcoal, filtering through Super-Cel and removing the solvent in vacuo. Crystallize the residue from benene-hexane to get 0.78 g. of pure title product; M.P. 145–146°;

$\lambda_{max.}^{KBr}$ 2.90μ

*Analysis.*—Calculated for $C_{20}H_{26}O_2$ (percent): C, 80.49; H, 8.78. Found (percent): C, 80.26; H, 8.76.

EXAMPLE 88 d(+)-3-methoxyestra-1,3,5(10),7-tetraen-17β-ol

Prepare a solution of sodium hydroxide (6.0 g.) in anhydrous methanol (250 ml.). To the stirred solution add as a solid, d(+)-3-methoxyestra-1,3,5(10),7-tetraen-17β-ol, formate (18.0 g.). Continue stirring at room temperature for ¾ hours. (The steroid substrate will completely dissolve and be replaced by a fine precipitate of sodium formate). Cool the reaction with an ice-bath and add water dropwise and with stirring until cloudiness appears. Add a seed of title compound and continue adding water until a total of 250 ml. has been added. Filter and completely dry ($P_2O_5$/vac.) the resulting white crystalline precipitate to obtain 16.3 g. of d(+)-3-methoxyestra-1,3,5(10),7-tetraen-17β-ol; M.P. 128–130°; $[\alpha]_D-182°$ (C=1, dioxane). Further purify by dissolving a sample (1.30 g.) in methylene chloride treating with Nuchar charcoal and filtering through Super-Cel. Replace the methylene chloride with isopropanol by boiling (steam bath), seed and let stand to complete crystallization. Filter the resulting long, fine needles to obtain 0.70 g. of title product; M.P. 136–138°; $[\alpha]_D+208°$ (C=1, dioxane);

$\lambda_{max.}^{KBr}$ 2.83μ; $\lambda_{max.}^{EtOH}$ 222 mμ (inf.; ε 7,600)

*Analysis.*—Calculated for $C_{19}H_{24}O_2$ (percent): C, 80.24; H, 8.51. Found (percent): C, 80.00; H, 8.25.

EXAMPLE 89

(±)-estra-1,3,5(10),8-tetraene-3,17β-diol

Add 3 molar ethereal methyl magnesium iodide (250 ml.) to (±)-3-methoxyestra-1,3,5(10),8-tetraen-17β-ol (30.0 g.) and under argon heat the reaction to 165°. Keep the temperature between 165–170° for 2.5 hours. Cool the reaction to room temperature then immerse the flask in a Dry-Ice acetone bath. Add tetrahydrofuran (500 ml.) and ethyl acetate (300 ml.), remove the bath and stir to fully decompose the mixture. Add water (100 ml.) saturated ammonium chloride solution (400 ml.) then dilute acetic acid to neutrality. Extract the mixture with ethyl acetate, wash the extract with water and saturated sodium chloride solution then dry over anhydrous sodium sulfate. Filter, remove the solvent in vacuo and dissolve the residue in hot tetrahydrofuran. Treat the solution with Nuchar charcoal, filter through Super-Cel and remove the solvent in vacuo. Crystallize the residue from chloroform to obtain 17.5 g. of the title product; M.P. 214–216°.

EXAMPLE 90

(±)-13-ethylgona-1,3,5(10),8-tetraene-3,17β-diol

Cover (±)-3-methoxy-13-ethylgona-1,3,5(10),8-tetraen-17β-ol (44.0 g.) with 3 molar ethereal methyl magnesium iodide (400 ml.) and under argon heat the solution to 160° (oil bath). Keep the oil bath temperature at 160–165° for 3 hours, then allow the reaction to cool to room temperature. Immerse the flask in a Dry Ice-acetone bath, then add tetrahydrofuran (500 ml.) and ethyl acetate (500 ml). Remove the bath and stir until the reaction is decomposed. Add water, 10% ammonium chloride solution (500 ml.) and dilute acetic acid to neutrality. Extract the mixture with ethyl aectate then wash the extract with saturated sodium bicarbonate solution, water and with saturated sodium chloride solution then dry over anhydrous sodium sulfate. Filter, remove the solvents in vacuo and triturate the residue with ether. Filter to obtain 35.5 g. of the title product, M.P. 177–180°. Further purify a samply (2.00 g.) by treating a tetrahydrofuran solution with Nuchar charcoal, filtering through Super-Cel and replacing the solvent with isopropanol. Filter the resulting crystalline solid to obtain 1.78 g. of the title product as the isopropanol solvate; M.P. 118–120° (loss of isopropanol) then 183–184°;

$\lambda_{max.}^{KBr}$ 3.02 and 3.17μ; $\lambda_{max.}^{EtOH}$ 270 mμ (ε 15,000)

*Analysis.*—Calculated for $C_{19}H_{24}O_2 \cdot C_3H_8O$ (percent): C, 76.70; H, 9.36. Found (percent): C, 76.59; H, 9.07.

EXAMPLE 91 d-estra-1,3,5(10),8-tetraene-3,17β-diol

Cover d(−)-3-methoxyestra-1,3,5(10),8-tetraen-17β-ol (15.0 g.) with 3 molar ethereal methyl magnesium iodide (160 ml.) and under argon heat the reaction to 165° (oil-bath). Keep the oil-bath temperature at 165–170° for 3 hours then cool the reaction to room temperature. Cool the flask further by immersion in a Dry-Ice-acetone bath then add tetrahydrofuran and ethyl acetate. Remove the bath and stir until the reaction is decomposed. Add water, saturated ammonium chloride solution and dilute acetic acid to neutrality. Extract the mixtture with ethyl acetate, wash the extract with water and saturated sodium chloride solution then dry over anhydrous sodium sulfate. Filter, remove the solvent in vacuo, dissolve the residue in chloroform and let stand to fully crystallize. Filter to obtain 14.0 g. of the title product; M.P. 115–121° (loss of chloroform). Further purify a sample (1.5 g.) by treating its tetrahydrofuran solution with Nuchar charcoal, filtering through Super-Cel and replacing the solvent with ethanol by boiling. Dilute the solution with an equal volume of water, scratch and stand to crystallize. Filter to obtain 0.4 g. of solvated title product; M.P. 135–139° (loss of water);

$$\lambda_{max.}^{KBr}\ 275\ m\mu\ (\epsilon\ 14{,}900)$$

$[\alpha]_D = 0$ (C=1, dioxane).

*Analysis.*—Calculated for $C_{18}H_{22}O_2.1/5H_2O$ (percent): C, 78.91; H, 8.24. Found (percent): C, 78.89; H, 8.23.

EXAMPLE 92

(±)-estra-1,3,5(10),8,14-pentaene-3,17β-diol

Cover (±) - 3 - methoxyestra-1,3,5(10),8,14-pentaen-17β-ol (5.00 g.) with 3 molar ethereal methyl magnesium iodide and heat the reaction under argon to 170° (oil-bath). Keep the oil-bath temperature at 170° for 2.5 hours then cool to room temperature. Cool the flask further by immersion in a Dry-Ice-acetone bath. Add tetrahydrofuran and ethyl acetate then remove the bath. Stir to decompose the reaction then add water, saturated ammonium chloride solution and dilute acetic acid to neutrality. Extract with ethyl acetate, wash the extract with water and saturated sodium chloride solution then dry over anhydrous sodium sulfate. Filter, remove the solvent in vacuo and dissolve the residue in methanol allowing it to stand to fully crystallize. Filter the crystalline precipitate to obtain 2.07 g. of the title product as a methanol solvate; M.P. 110–113° (loss of methanol);

$$\lambda_{max.}^{EtOH}\ 311\ m\mu$$

EXAMPLE 93

(±)-estra-1,3,5(10),8-tetraene-3,17β-diol

Add a solution of (±)-estra-1,3,5(10),8,10-pentaene-3,17β-diol (1.50 g.) in tetrahydrofuran (25 ml.) to a prehydrogenated mixture of 2% palladium on calcium carbonate (0.50 g.) and tetrahydrofuran-ethanol (50–10 ml.) and continue to treat with hydrogen until 1 mole of hydrogen is taken up. Filter the mixture through Super-Cel, remove the solvent in vacuo and dissolve the residue in tetrahydrofuran. Treat the solution with Nuchar charcoal, filter through Super-Cel and remove the solvent in vacuo. Dissolve the resulting oil in ether and let stand to fully crystallize. Filter the resulting prisms to obtain 0.69 g. of the title product; M.P. 210–213°;

$$\lambda_{max.}^{EtOH}\ 276\ m\mu\ (\epsilon\ 13{,}600)$$

EXAMPLE 94

(±)-estra-1,3,5(10)-triene-3,8,17β-triol

Cover (±)-3-methoxyestra-1,3,5(10)-triene-8,17β - diol (3.00 g.) with 3 molar ethereal methyl magnesium iodide (50 ml.) and heat the reaction under nitrogen to 165° (oil-bath). Keep the oil bath at 165–170° for 2.5 hours then cool to room temperature. Cool the reaction further by immersing the flask in a Dry-Ice-acetone bath then add tetrahydrofuran (100 ml.) and ethyl acetate (100 ml.). Remove the bath and stir until the reaction is decomposed. Add water (50 ml.), saturated ammonium chloride (200 ml.) then extract with ethyl acetate. Wash the extract with water, saturated sodium chloride solution then dry over anhydrous sodium sulfate. Filter, remove the solvents in vacuo and dissolve the residue in warm tetrahydrofuran. Treat the solution with Nuchar charcoal, filter through Super-Cel and remove the solvent in vacuo. Crystallize the residue from chloroform to get 1.15 g. of title product; M.P. 221–225°. Dissolve the product in boiling methanol-tetrahydrofuran (1:1), filter hot through Super-Cel then boil the solution to low volume and let stand to deposit 0.65 g. of pure title product; M.P. 254–256°;

$$\lambda_{max.}^{KBr}\ 2.95\ and\ 3.12\mu$$

*Analysis.*—Calculated for $C_{18}H_{24}O_3$ (percent): C, 74.97; H, 8.39. Found (percent): C, 75.03; H. 8.15.

EXAMPLE 95

(±)-estra-1,3,5(10),7-tetraene-3,17β-diol

Cover (±)-3-methoxyestra-1,3,5(10),7-tetraen-17β - ol (4.40 g.) with 3 molar ethereal methyl magnesium iodide (60 ml.) and under nitrogen heat the reaction to 165° (oil bath). Keep the temperature at 165–170° for 2 hours then cool to room temperature. Cool the flask further by immersion in a Dry-Ice-acetone bath. Add tetrahydrofuran and ethyl acetate then remove the bath. Stir until the reaction is decomposed. Add water, ammonium chloride solution and dilute acetic acid to neutrality. Extract the mixture with ethyl acetate, wash the extract with water and saturated sodium chloride solution then dry over anhydrous sodium sulfate. Filter, evaporate the solvent in vacuo and dissolve the residue in tetrahydrofuran. Treat the solution with Nuchar charcoal, filter through Super-Cel and remove the solvent in vacuo. Crystallize the oil from chloroform to get 3.60 g.; M.P. 213–215.

$$\lambda_{max.}^{KBr}\ 2.93\ and\ 3.19\mu$$

EXAMPLE 96

(±)-13-ethylgona-1,3,5(10),7-tetraene-3,17β-diol

Cover (±)-3-methoxy-13-ethylgona-1,3,5(10),7 - tetraen-17β-ol (3.85 g.) with 3 molar ethereal methylmagnesium iodide (50 ml.) and under argon heat the reaction to 165° (oil-bath). Keep the oil-bath at 165–170° for 3 hours then cool the reaction to room temperature. Cool the flask further by immersion in a Dry-Ice-acetone bath then add tetrahydrofuran (100 ml.) and ethyl acetate (60 ml.). Remove the bath and stir until the reaction is decomposed. Add ethyl acetate (60 ml.), water (50 ml.), saturated ammonium chloride solution (100 ml.) and dilute acetic acid to neutrality. Extract the mixture with ethyl acetate, wash the extract with waer and saturated sodium chloride solution then dry over anhydrous sodium sulfate. Filter, remove the solvent in vacuo and dissolve the residue in tetrahydrofuran. Treat the solution with Nuchar charcoal, filter through Super-Cel and remove the solvent in vacuo. Crystallize the residue from isopropanol to get 2.86 g. of the title product; M.P. 212–216°. The analytical sample (from isopropanol), isolated as an isopropanol solvate had M.P. 218–220°;

$$\lambda_{max.}^{KBr}\ 2.97\ and\ 3.16\mu$$

*Analysis.*—Calculated for $C_{19}H_{22}O_2.C_3H_8O$ (percent): C, 76.70; H, 9.36. Found (percent): C, 77.11; H, 9.01.

EXAMPLE 97 d(+)-estra-1,3,5(10),7-tetraene-3,17β-diol

Add a 3 M ethereal solution of methylmagnesium iodide (200 ml.) to d(+)-3-methoxyestra-1,3,5(10),7-tetraen-17β-ol (15.7 g.). Under argon (or other inert gas), heat the reaction to 165° C. Keep the temperature at 165–170° for 3 hours. Cool the reaction to room temperature, then cool to −78° by immersion in a Dry-Ice-acetone bath. Add tetrahydrofuran (400 ml.) and stir to partly decompose the reaction, then add ethyl acetate (200 ml.) and remove the bath. Continue stirring as the reaction warms up and decomposes. Small quantities of water (10–20 ml.) may be occasionally added using the Dry-Ice bath to keep the temperature well below room temperature. When the reaction is completely decomposed, add saturated ammonium chloride solution then dilute acetic acid solution to neutrality. Extract the mixture well with ethyl acetate. Wash the extract with water and with saturated sodium chloride and dry it over anhydrous sodium sulfate. Filter and remove the solvent in vacuo. Dissolve the residue in tetrahydrofuran, treat with Nuchar charcoal and filter through Super-Cel. Remove the solvent in vacuo and dissolve the oil in chloroform. Let stand to crystallize (−10° C.), then filter the white crystalline solid to obtain 12.3 g. of the title product, M.P. 172–173°; $[\alpha]_D + 188°$ (C=1, dioxane). A sample may be further purified by dissolving in hot isopropanol and diluting with water. The resulting fine white needles had M.P. 174–175°; $[\alpha]_D^{24}+211°$ (C=1, dioxane);

$\lambda_{max}^{KBr}$ 3.0 and 3.15$\mu$; $\lambda_{max}^{EtOH}$ 222 m$\mu$ (inf.; $\epsilon$ 8,250)

EXAMPLE 98

($\pm$)-3-hydroxyestra-1,3,5(10),7-tetraen-17-one

Reflux a solution of ($\pm$)-estra-1,3,5(10),7-tetraene-3,17$\beta$-diol (3.52 g.) in methyl ethyl ketone (60 ml.) and benzene (100 ml.) into a water separator for 1 hour and remove 10 ml. of distillate. Add aluminum isopropoxide (3.0 g.) and continue refluxing for 3.5 hours then cool to room temperature. Add water (100 ml.) and dilute hydrochloric acid to pH 6, stir then extract the mixture with ethyl acetate. Wash the extract with water and saturated sodium chloride solution then dry over anhydrous sodium sulfate. Filter, remove the solvent in vacuo and dissolve the residue in tetrahydrofuran. Treat the solution with Nuchar charcoal, filter through Super-Cel then replace the solvent with isopropanol by boiling. Let stand to deposit 2.12 g. of the title product; M.P. 212–214°. Retreat a boiling methanolic-tetrahydrofuran solution of the product with Nuchar charcoal, filter the hot solution through Super-Cel and again replace the solvent with isopropanol by boiling. Cool and filter to obtain 1.08 g. of the pure title product; M.P. 222–224°;

$\lambda_{max}^{KBr}$ 3.0 and 5.82$\mu$

*Analysis.*—Calculated for $C_{18}H_{20}O_2$ (percent): C, 80.56; H, 7.51. Found (percent): C, 80.68; H, 7.62.

EXAMPLE 99

($\pm$)-3-hydroxy-13-ethylgona-1,3,5(10),7-tetraen-17-one

Reflux a solution of ($\pm$)-13-ethylgona-1,3,5(10),7-tetraene-3,17$\beta$-diol (2.85 g.) in methyl ethyl ketone (50 ml.) and benzene (100 ml.) into a water separator for 1 hour then remove 10 ml. of distillate. Add aluminum isopropoxide (2.50 g.) and continue refluxing for 4.5 hours then cool to room temperature. Add water (100 ml.) and ethyl acetate, stir then add dilute hydrochloric acid to pH 6. Wash the organic layer with water and saturated sodium chloride solution then dry over anhydrous sodium sulfate. Filter, remove the solvent in vacuo and crystallize the residue from ether. Filter to obtain 1.23 g. of the title product; M.P. 187–190°. Dissolve the product in tetrahydrofuran, treat with Nuchar charcoal and filter through Super-Cel. Replace the solvent with isopropanol by boiling and let stand and cool to complete crystallization. Filter to obtain 0.83 g. of pure title product; M.P. 189–191°;

$\lambda_{max}^{KBr}$ 2.96 and 5.82$\mu$

*Analysis.*—Calculated for $C_{19}H_{22}O_2$ (percent): C, 80.81; H, 7.85. Found (percent): C, 80.51; H, 7.70.

EXAMPLE 100

$d(+)$-3-hydroxyestra-1,3,5(10),7-tetraen-17-one

Dissolve $d(+)$-estra-1,3,5(10),7-tetraene-3,17$\beta$-diol (12.0 g.) in methyl ethyl ketone (150 ml.) and benzene (200 ml.) and reflux the solution under nitrogen into a water separator. After ½ hour remove 25 ml. of distillate then again after another ½ hour remove 25 ml. To the refluxing solution add a filtered solution of aluminum isopropoxide (10 g.) in benzene (100 ml.) and continue refluxing for 6 hours. Add another charge of aluminum isopropoxide (10 g.) in benzene (100 ml.) and continue refluxing for another 10 hours. Cool the reaction to room temperature. Add water (500 ml.) followed by dilute hydrochloric acid to pH 6. Extract the mixture with ethyl acetate. Wash the extract with water, saturated sodium bicarbonate solution and brine then dry over anhydrous sodium sulfate. Filter and evaporate the solvent in vacuo. Dissolve the residue in boiling tetrahydrofuran, treat with Nuchar and filter through Super-Cel. Remove the solvent in vacuo. Dissolve the resulting yellow oil in isopropanol, seed and let stand at −10° C. Filter to get 7.0 g. of impure $d(+)$-equilin; M.P. 228–233°;

$\lambda_{max}^{KBr}$ 3.03 and 5.82$\mu$ $[\alpha]_D^{24}+286°$ (C=1, dioxane). Further purify the sample by dissolving it in tetrahydrofuran treating with Nuchar charcoal and filtering through Super-Cel. Replace the solvent with isopropanol by boiling on the steam bath. Seed the solution and let stand at 10° C. to fully crystallize. Filter the white plates of $d(+)$-equilin to obtain 5.08 g.; M.P. 236–239°;

$\lambda_{max}^{KBr}$ 3.03 and 5.82$\mu$ $[\alpha]_D^{24}+282°$ (C=1, dioxane). All mother liquors from above deposited a total of 1.27 g. of second crops which upon purification as above gave a further 0.64 g. of $d(+)$-equilin; M.P. 232–234°.

EXAMPLE 101

$d(+)$-3-cyclopentyloxyestra-1,3,5(10),7-tetraen-17-one

Add $d(+)$-3-hydroxyestra-1,3,5(10),7-tetraen-17-one (2.00 g. of $d(+)$-equilin) to a solution of sodium methoxide (0.60 g.) in absolute ethanol (30 ml.). Add cyclopentyl bromide (2.5 g.) to the solution then reflux for 2 hours. Cool the reaction to room temperature, add water and ethyl acetate then filter to obtain 0.91 g. of crude product. Obtain more of the product from the filtrate by washing the organic layer with water and saturated sodium chloride solution, drying over anhydrous sodium sulfate, filtering and evaporating the solvent in vacuo. Dissolve the combined solids in methylene chloride, treat with Nuchar charcoal and filter the mixture through Super-Cel. Replace the solvent with isopropanol by boiling, cool and let stand to fully crystallize. Filter to obtain 1.70 g. of the pure title product, M.P. 190–192°;

$\lambda_{max}^{KBr}$ 5.80$\mu$ $[\alpha]_D^{24}+247°$ (C=1, Chf.).

*Analysis.*—Calculated for $C_{23}H_{28}O_2$ (percent): C, 82.10; H, 8.39. Found (percent): C, 82.14; H, 8.71.

EXAMPLE 102

($\pm$)-3-cyclopentyloxy-13-ethylgona-1,3,5(10),7-tetraen-17-one

Add ($\pm$)-3-hydroxy-13-ethylgona-1,3,5(10),7-tetraen-17-one (4.00 g.) to a solution of sodium methoxide (1.00 g.) in absolute ethanol (100 ml.). Add cyclopentyl bromide (5.0 g.) and reflux the reaction for 5 hours then cool to room temperature. Add water (300 ml.) and extract the mixture with ethyl acetate. Wash the extract with water and saturated sodium chloride solution then dry over anhydrous sodium sulfate. Filter, remove the solvent in vacuo and dissolve the oil in benzene. Pass the solution through a column of 10% silver nitrate-impregnated alumina, remove the solvent in vacuo and dissolve the residue in methylene chloride. Treat the solution with Nuchar charcoal, filter through Super-Cel and replace the solvent with isopropanol by boiling. Let cool and stand to deposit 2.00 g. of the pure title produce; M.P. 134–136°;

$\lambda_{max}^{KBr}$ 5.79$\mu$

*Analysis.*—Calculated for $C_{24}H_{30}O_2$ (percent): C, 82.24; H, 8.63. Found (percent): C, 82.25; H, 8.90.

EXAMPLE 103

($\pm$)-3-cyclopentyloxyestra-1,3,5(10),8-tetraen-17$\beta$-ol

Add ($\pm$)-estra-1,3,5(10),8-tetraene-3,17$\beta$-diol (5.00 g.) to a solution of sodium methoxide (1.50 g.) in absolute ethanol (100 ml.). Add cyclopentyl bromide (5.0 g.) and reflux the solution for 2 hours. Cool, remove the ethanol in vacuo and decompose the residue with water and ethyl acetate. Wash the extract with water and saturated sodium chloride solution then dry over anhydrous sodium sulfate. Filter, remove the solvent in vacuo and dissolve the residue in methylene chloride. Treat the solution with Nuchar charcoal, filter through Super-Cel and replace the solvent with isopropanol by boiling. Let cool and stand to deposit 4.3 g. of the title product; M.P. 117–121°. Dissolve a sample (1.00 g.) of the product in methylene chloride and repeat the above purification procedure to obtain 0.80 g. of the solvated title product; M.P. 124–126°;

$\lambda_{max.}^{KBr}$ 3.06μ; $\lambda_{max.}^{EtOH}$ 278 mμ (ε 17,800)

*Analysis.*—Calculated for $C_{23}H_{30}O_2 \cdot 1/2 C_3H_8O$ (percent: C, 79.84; H, 9.30. Found (percent): C, 79.97; H, 8.92.

EXAMPLE 104

(±)-3-methoxy-17α-ethynylestra-1,3,5(10),7-tetraen-17β-ol

Dissolve (±) - 3-methoxyestra-1,3,5(10),7-tetraen-17-one (3.00 g.) in dimethylacetamide (75 ml.) and bubble purified acetylene through the solution to saturation. Add 1.0 g. of lithium acetylide-ethylenediamine and under acetylene stir the reaction at room temperature for 4 hours. Add another charge of lithium acetylide-ethylenediamine (1.0 g.) and stir overnight. Pour the reaction into water, extract with ether and wash the extract with water, dry over anhydrous sodium sulfate, filter and remove the solvent in vacuo. Dissolve the residue in benzene, filter through a column of Florex XXS, evaporate the solvent in vacuo and crystallize the residue from methanol to obtain 0.725 g. of the title product; M.P. 126–128°;

$\lambda_{max.}^{KrB}$ 2.92 and 3.06μ

The analytical sample (from methanol) had M.P. 171–172°;

*Analysis.*—Calculated for $C_{21}H_{24}O_2$ (percent): C, 81.78; H, 7.84. Found (percent): C, 81.64; H, 7.58.

EXAMPLE 105

(±)-3-methoxy-13-ethyl-17α-ethynylgona-1,3,5(10),7-tetraen-17β-ol

Dissolve (±) - 3-methoxy-13-ethylgona-1,3,5(10),7-tetraen-17-one (2.0 g.) in dimethylacetamide (50 ml.) and bubble acetylene through the solution to saturation (½ hour). Add lithium acetylide-ethylenediamine (1.0 g.) and stir the reaction under acetylene for 5 hours at room temperature. Allow the reaction to stand overnight then pour it into water, extract with ether and wash the extract with water then dry over anhydrous sodium sulfate. Filter, evaporate the solvent in vacuo and crystallize the residue from methylene chloride-hexane to get 0.875 g. of title product; M.P. 148–151°;

$\lambda_{max.}^{KBr}$ 2.93 and 3.09μ

The analytical sample (from isopropanol-hexane) had M.P. 153–155°.

*Analysis.*—Calculated for $C_{22}H_{26}O_2$ (percent): C, 81.95; H, 8.13. Found (percent): C, 81.61; H, 7.85.

EXAMPLE 106

(±)-3-methoxy-13-ethyl-17α-ethynylgona-1,3,5(10),7-tetraen-17β-ol

Dissolve (±) - 3-methoxy-13-ethylgona-1,3,5(10),7-tetraen-17-one (2.0 g.) in dimethylsulfoxide (50 ml.) and bubble purified acetylene through the solution to saturation (½ hour). Add lithium acetylide-ethylenediamine (1.2 g.) and stir the reaction under acetylene for 1 hour at room temperature. Pour the reaction onto ice, extract with ether and wash the extract with water and brine. Dry over anhydrous sodium sulfate, filter and evaporate in vacuo. Crystallize the residue from isopropanol to get 1.56 g. of the pure title product; M.P. 166–168°.

EXAMPLE 107 d-3-cyclopentyloxy-17α-ethynylestra-1,3,5(10),7-tetraen-17β-ol

Dissolve d-3-cyclopentyloxyestra - 1,3,5(10),7-tetraen-17-one (2.00 g.) in dimethylacetamide (50 ml.) and saturate the solution with acetylene. Add lithium acetylide-ethylenediamine (1.0 g.) and stir the reaction under acetylene for 5 hours at room temperature. Pour into water, extract with ether, wash and dry (sodium sulfate) the extract, filter and evaporate the solvent in vacuo. Crystallize the residue from benzene-hexane to obtain the title product.

EXAMPLE 108

(±)-3-cyclopentyloxy-13-ethyl-17α-ethynylgona-1,3,5(10),7-tetraen-17β-ol

Dissolve (±)-3-cyclopentyloxy-13-ethylgona-1,3,5(10),7-tetraen-17-one (3.00 g.) in dimethylacetamide (75 ml.) and saturate the solution with acetylene. Add lithium-acetylide-ethylenediamine (2.0 g.) and stir the reaction under acetylene overnight at room temperature. Pour the reaction into water, wash and dry the extract, filter and evaporate the solvent in vacuo. Crystallize the residue from benzene-hexane to obtain the title product.

EXAMPLE 109

(±)-3-cyclopentyloxy-13-ethyl-17α-ethynylgona-1,3,5(10),7-tetraen-17β-ol

Dissolve (±)-3-cyclopentyloxy-13-ethylgona-1,3,5(10),7-tetraen-17-one (1.45 g.) in dimethylsulfoxide (75 ml.) and saturate the solution with purified acetylene. Add lithium acetylide-ethylenediamine (0.90 g.) and stir the reaction under acetylene for 1½ hours at room temperature. Pour the reaction onto ice, extract with ethyl acetate-ether (1:1) and wash, dry and evaporate the extract. Dissolve the residue in warm hexane, and chromatograph the solution on a column of Florex XXS. Elute the product with benzene, remove the solvent in vacuo. Treat a methylene chloride solution of the residue with Nuchar charcoal, filter through Super-Cel and remove the solvent in vacuo to obtain the product as a white glass (1.33 g.);

$\lambda_{max.}^{KBr}$ 2.95 and 3.10μ

*Analysis.*—Calculated for $C_{26}H_{32}O_2$ (percent): C, 82.93; H, 8.57. Found (percent): C, 82.56; H, 8.40.

EXAMPLE 110

(±)-3-methoxy-17α-ethynylestra-1,3,5(10),7-tetraen-17β-ol

Add a solution of (±)-3-methoxy-17α-ethynylestra-1,3,5(10),7-tetraen-17β-ol (0.50 g.) in benzene (30 ml.) to a pre-hydrogenated mixture of 2% palladium oxide on calcium carbonate (0.20 g.) and benzene (25 ml.) and continue to treat with hydrogen until uptake of the gas is complete. Filter, remove the solvent in vacuo and crystallize the residue from methanol to get 0.460 g. of the title product; M.P. 167–169°;

$\lambda_{max.}^{KBr}$ 2.95μ

*Analysis.*—Calculated for $C_{21}H_{28}O_2$ (percent): C, 80.73; H, 9.03. Found (percent): C, 80.29; H, 8.93.

EXAMPLE 111

(±)-3-methoxy-13,17α-diethylgona-1,3,5(10),7-tetraen-17β-ol

Add a solution of (±)-3-methoxy-13-ethyl-17α-ethynylgona-1,3,5(10),7-tetraen-17β-ol (0.515 g.) in benzene (50 ml.) to a pre-hydrogenated mixture of 2% palladium oxide on calcium carbonate (0.20 g.) and benzene (25 ml.) and continue to treat with hydrogen until uptake of the gas is complete. Filter, remove the solvent in vacuo and crystallize the residue from methanol to get 0.44 g. of the title product; M.P. 130–132°;

$$\lambda_{max.}^{KBr} \ 2.90\mu$$

*Analysis.*—Calculated for $C_{22}H_{30}O_2$ (percent): C, 80.93; H, 9.26. Found (percent): C, 80.76; H, 9.25.

EXAMPLE 112

$d(+)$-3-methoxyestra-1,3,5(10),7-tetraen-17-one

Allow a solution of $d(+)$-3-methoxyestra-1,3,5(10),7-tetraen-17β-ol (0.43 g.) in dimethylsulfoxide (6 ml.) and acetic anhydride (2 ml.) to stand overnight. Pour the reaction into water then filter and air-dry the resulting precipitate. Dissolve the solid in benzene and pass the solution through a column of 10% silver nitrate-impregnated alumina. Remove the benzene in vacuo, dissolve the residue in methylene chloride, treat with Nuchar charcoal and filter the mixture through Super-Cel. Replace the solvent with absolute ethanol by boiling, cool and let stand to complete crystallization. Filter to obtain 0.24 g. of the title product; M.P. 156–158°;

$$\lambda_{max.}^{KBr} \ 5.76\mu$$

$[\alpha]_D^{24} + 277°$ (C=1, Chf.).

EXAMPLE 113

*dl*-3-methoxyestra-1,3,5(10),7-tetraen-17-one

Cool dimethylformamide (200 ml.) in an ice-bath, then with stirring and under nitrogen add phosphorus oxychloride (30 ml.) followed by powdered *dl*-8-hydroxy-3-methoxyestra-1,3,5(10)-trien-17-one (10.0 g.). Stir the reaction for 5 minutes, remove the ice-bath and stir at room temperature for 5 minutes then pour the reaction into an ice-cold solution of pyridine (150 ml.) in water (600 ml.), stir with a small amount of ether to promote crystallization and filter the resulting solid onto filter-aid (Super-Cel). Extract the filter cake with methylene chloride, filter and reduce the solvent to low volume by evaporation in vacuo. Treat the solution with Nuchar charcoal, filter and evaporate the solvent in vacuo. Dissolve the resulting oil in hot isopropyl alcohol and let stand to obtain 8.30 g. of the title product, M.P. 129–132°.

EXAMPLE 114

*dl*-13-ethyl-3-methoxygona-1,3,5(10),7-tetraen-17-one

Cool dimethylformamide (200 ml.) with an ice-bath then with stirring and under nitrogen add phosphorus oxychloride (30 ml.) followed by powdered *dl*-13-ethyl-8-hydroxy-3-methoxygona-1,3,5(10)-trien-17-one (10.0 g.). Stir the reaction for 5 minutes, remove the ice-bath and stir at room temperature for 5 minutes then pour the reaction into an ice-cold solution of pyridine (180 ml.) in water (600 ml.), stir with a small amount of ether to promote crystallization and filter the resulting solid onto filter-aid (Super-Cel). Extract the filter-cake with methylene chloride, filter and evaporate the solvent to low volume in vacuo. Treat the solution with Nuchar charcoal, filter and remove the solvent in vacuo. Dissolve the resulting oil in hot isopropyl alcohol and let stand to obtain 8.52 g. of the title product as large white prisms, M.P. 115–118°. Retreat with charcoal as above to obtain 7.20 g. of pure title product, M.P. 122–125°.

EXAMPLE 115

$d$-3-methoxyestra-1,3,5(10),7-tetraen-17β-ol, formate

Cool dimethylformamide (80 ml.) with an ice-bath then under nitrogen add phosphorus oxychloride (15 ml.) followed by powdered $d$-3-methoxyestra-1,3,5(10)-triene-8,17β-diol (4.00 g.). Stir the reaction at room temperature for 10 minutes then pour the reaction into cold water and stir until the product is fully precipitated. Filter the solid onto Super-Cel, extract the filter-cake with ethyl acetate, filter and dry the filtrate with anhydrous sodium sulfate. Filter, remove the solvent in vacuo and treat the residue in methylene chloride with Nuchar charcoal. Filter, remove the methylene chloride in vacuo and crystallize the residue from isopropyl alcohol to obtain 3.35 g. of the pure title product, M.P. 154–156°;

$$\lambda_{max.}^{KBr} \ 5.86\mu$$

$[\alpha]_D^{24} + 135°$ (c., 1% in dioxane).

EXAMPLE 116

*dl*-estra-1,3,5(10),7-tetraene-3,17β-diol, diformate

Cool dimethylformamide (20 ml.) in an ice-bath, add phosphorus oxychloride (3 ml.), stir and add *dl*-estra-1,3,5(10)-triene-3,8,17β-triol (1.00 g.). Stir the reaction at room temperature for 7 minutes then pour it into an ice-cold solution of pyridine (12 ml.) in water (200 ml.) and stir the mixture until precipitation is complete. Filter the solid onto Super-Cel, extract the filter-cake with methylene chloride, filter and evaporate the solvent to low volume in vacuo. Treat the solution with Nuchar charcoal, filter then replace the solvent with isopropyl alcohol by boiling and let stand to deposit 0.61 g. of the title product, M.P. 113–115°. Further purify the sample by treating again with decolorizing charcoal as above to obtain from isopropyl alcohol 0.43 g. of the pure title product, M.P. 118–120°;

$$\lambda_{max.}^{KBr} \ 5.79 \text{ and } 5.88\mu$$

*Analysis.*—Calculated for $C_{20}H_{22}O_4$ (percent): C, 73.60; H, 6.79. Found (percent): C, 73.71; H, 7.00.

EXAMPLE 117

*dl*-estra-1,3,5(10),7-tetraene-3,17β-diol

Add *dl*-estra-1,3,5(10),7-tetraene-3,17β-diol, diformate (0.50 g.) to a solution of potassium hydroxide (300 mg.) in water (5 ml.) and methanol (30 ml.) and heat the reaction on the steam bath for 15 minutes. Cool and dilute the solution with water (75 ml.) then add solid ammonium chloride (5 g.) to fully precipitate the product. Filter the resulting solid onto Super Cel, extract the filter-cake with tetrahydrofuran, filter and remove the solvent in vacuo. Treat the residue in tetrahydrofuran with Nuchar charcoal, filter and evaporate the solvent in vacuo. Crystallize the residue from ethyl acetate to obtain 0.30 g. of the title product, M.P. 220–222°.

EXAMPLE 118

*dl*-3-hydroxyestra-1,3,5(10),7-tetraen-17-one

Reflux a solution of *dl*-estra-1,3,5(10),7-tetraene-3,17β-diol, diformate (2.50 g.) in benzene (100 ml.) and methyl ethyl ketone (25 ml.) into a water separator for 1 hour then add aluminum isopropoxide (3.0 g.) and continue refluxing for 4 hrs. Cool, add water (250 ml.), stir then filter the mixture through filter-aid. Extract the filtrate with ethyl acetate, wash dry and evaporate the extract in vacuo. Treat the resulting oil in tetrahydrofuran with Nuchar charcoal, filter and remove the solvent in vacuo. Crystallize the residue from isopropyl alcohol to obtain 0.83 g. of the title product, M.P. 220–223°.

EXAMPLE 119

$d$-3-hydroxyestra-1,3,5(10),7-tetraen-17-one

Reflux a solution of $d$-estra-1,3,5(10),7-tetraene-3,17β-diol (3.0 g.) in benzene (100 ml.) and methyl ethyl ketone (40 ml.) under nitrogen into a water separator for 1 hour. Add aluminum isopropoxide (3.0 g.) and continue refluxing for 2 hrs. Cool to room temperature, add water (200 ml.) and stir. Filter the two phase mixture through Super-Cel, dilute with ethyl acetate, wash the organic layer with water and brine and dry over anhydrous sodium sulfate. Filter, remove the solvent in vacuo and dissolve the residue in tetrahydrofuran. Treat the solution with Nuchar charcoal, filter and evaporate the solvent in vacuo. Crystallize the residue from isopropanol to obtain 2.07 g. of the title product, M.P. 232–235°; [α]$_D$+287° (c., 1% in dioxane).

EXAMPLE 120 d-13-ethyl-3-methoxygona-1,3,5(10),9(11)-tetraene-8,17β-diol

Dissolve d-13-ethyl-3-methoxygona-1,3,5(10),8-tetraen-17β-ol (10.0 g.) in benzene (200 ml.) and hexane (35 ml.), add potassium carbonate (10.0 g.) and cool the solution with an icebath. With stirring add m-chloroperbenzoic acid (6.7 g.) and continue stirring for 30 minutes. Remove the ice-bath and stir at room temperature for 3 hours. Dilute the reaction with ethyl acetate, was the extract with 5% potassium carbonate, water and brine then dry over anhydrous sodium sulfate. Filter and remove the solvent in vacuo and crystallize the resulting oil from methanol to obtain 10.20 g. of the title product. Treat a sample (1.00 g.) of the solid with Nuchar charcoal in methylene chloride, filter and remove the solvent in vacuo. Crystallize the oil from methanol to obtain 0.79 g. of title product as a methanol solvate, M.P. 93–95°;

$\lambda_{max.}^{KBr}$ 3.10μ

[α]$_D$−28° (c., 1% in dioxane).

EXAMPLE 121 d-13-ethyl-3-methoxygona-1,3,5(10)-triene-8,17β-diol

Pretreat a mixture of 5% palladium on carbon (3.0 g.) and ethanol (50 ml.) with hydrogen at one atmosphere. Add a solution of d-13-ethyl-3-methoxygona-1,3,5(10),9(11)-tetraene-8,17α-diol (9.18 g.) in ethanol (350 ml.) and continue to treat with hydrogen until uptake of the gas is complete. Filter, remove the solvent in vacuo and treat the resulting oil in methylene chloride with Nuchar charcoal. Filter, remove the solvent in vacuo and crystallize the resulting oil from ether to obtain 6.41 g. of title product, M.P. 168.5–170.5° [α]$_D$+28° (c., 1% in dioxane). Treat a sample (0.50 g.) of the solid again in methylene chloride with Nuchar charcoal, filter, remove the solvent in vacuo and crystallize the resulting oil from ether to obtain 0.27 g. of pure title product, M.P. 171–172°;

$\lambda_{max.}^{KBr}$ 3.05μ

[α]$_D$+35° (c., 1% in dioxane).

Analysis.—Calculated for $C_{20}H_{28}O_3$ (percent): C, 75.91; H, 8.92. Found (percent): C, 75.92; H, 9.08.

EXAMPLE 122 d-13-ethyl-3-methoxygona-1,3,5(10),7-tetraen-17β-ol, formate

Cool dimethylformamide (100 ml.) in an ice-bath, then under nitrogen and with stirring add phosphorus oxychloride (15 ml.) dropwise, followed by d-13-ethyl-3-methoxygona-1,3,5(10)-triene-8,17β-diol (5.78 g.). Continue stirring 5 minutes, remove the ice-bath and stir at room temperature a further 5 minutes. Pour the reaction into an ice-cold solution of pyridine (50 ml.) in water (500 ml.). Stir the mixture until precipitation is complete, filter and solid onto Super-Cel and dry the filter-cake. Extract the filter-cake with methylene chloride, filter and evaporate the solvent in vacuo. Crystallize the residue from isopropanol to obtain 3.00 g. of the title product as long colorless needles, M.P. 75–78°;

$\lambda_{max.}^{KBr}$ 5.87μ

[α]$_D$+121° (c., 1% in chloroform).

EXAMPLE 123 d-13-ethyl-3-methoxygona-1,3,5(10),7-tetraen-17β-ol

To a solution of potassium hydroxide (1.0 g.) in methanol (50 ml.) add d-13-ethyl-3-methoxygona-1,3,5(10)7-tetraen-17β-ol, formate (2.00 g.). Stir at room temperature until all solids pass into solution (15 minutes), then stir a further 1 hour. Add water (100 ml.) dropwise to the stirred solution and filter the resulting white crystalline precipitate onto Super-Cel. Extract the filter-cake with methylene chloride, filter and evaporate the solvent to low volume in vacuo. Treat the solution with Nuchar charcoal, filter and remove the solvent in vacuo. Crystallize the resulting oil from isopropanol to obtain 1.10 g. of the title product as a solvate, M.P. 110–112°. Dry a sample at 60° in vacuo to get the pure title product, M.P. 130–132°.

$\lambda_{max.}^{KBr}$ 3.1μ

[α]$_D$+172° (c., 1% in chloroform).

EXAMPLE 124 dl-3-methoxyestra-1,3,5(10),9(11)-tetraene-8,17α-diol, 17-acetate

Cool a solution of dl-3-methoxyestra-1,3,5(10),8-tetraen-17α-ol, acetate (3.5 g.) in benzene (150 ml.) and hexane (25 ml.) with an ice-bath, then with stirring add m-chloroperbenzoic acid (2.18 g.) and continue stirring for 15 minutes. Remove the ice-bath and stir the reaction at room temperature for 2 hours. Quench the reaction with 5% potassium carbonate solution (250 ml.), dilute with ethyl acetate then was the extract with 5% potassium carbonate solution, water and brine and dry over sodium sulfate. Filter, remove the solvent in vacuo and crystallize the resulting oil from ether to obtain 1.13 g. of the title product, M.P. 133–135°;

$\lambda_{max.}^{KBr}$ 3.13 and 5.81μ $\lambda_{max.}^{EtOH}$ 258 mμ (ε 17,900)

Analysis.—Calculated for $C_{21}H_{26}O_4$ (percent): C, 73.66; H, 7.66. Found (percent): C, 73.46; H, 7.73.

EXAMPLE 125 dl-3-methoxyestra-1,3,5(10)-triene-8,17α-diol, 17-acetate

Pretreat a mixture of 5% palladium on carbon (0.40 g.) and absolute ethanol (50 ml.) with hydrogen at 1 atmosphere. Add a solution of dl-3-methoxyestra-1,3,5(10),9(11)-tetraene-8,17β-diol, 17-acetate (1.40 g.) in absolute ethanol (150 ml.) and continue treating with hydrogen until uptake of the gas is complete. Filter and evaporate the solvent in vacuo. Treat the resulting oil in methylene chloride with Nuchar charcoal, filter and remove the solvent in vacuo. Dissolve the resulting oil in a small amount of ether, add hexane to cloudiness then add several drops more of ether and let stand to crystallize. Filter to obtain 1.30 g. of the pure title product, M.P. 119–122°.

$\lambda_{max.}^{KBr}$ 2.93 and 5.83μ

Analysis.—Calculated for $C_{21}H_{28}O_4$ (percent): C, 73.22; H, 8.19. Found (percent): C, 73.08; H, 8.11.

EXAMPLE 126 dl-3-methoxyestra-1,3,5(10),7-tetraen-17α-ol, acetate

Cool dimethylformamide (25 ml.) in an ice-bath, add phosphorus oxychloride (4 ml.) dropwise to the stirred solution then add dl-3-methoxyestra-1,3,5(10)-triene-8,17α-diol, 17-acetate (1.50 g.). Stir, remove the ice bath and continue stirring for 10 minutes. Pour the reaction into ice-water and filter the resulting white crystalline solid. Treat the solid in methylene chloride with Nuchar charcoal, filter and replace the solvent with acetone by boiling. Add hexane to the hot acetone solution, seed and let stand to obtain 0.48 g. of pure title product, M.P. 98–100°.

$\lambda_{max.}^{KBr}$ 5.80μ

Analysis.—Calculated for $C_{21}H_{26}O_3$ (percent): C, 77.27; H, 8.03. Found (percent): C, 77.23; H, 7.79.

Obtain second crops of title product (0.65 g.), M.P. 92–93°.

EXAMPLE 127 dl-3-methoxyestra-1,3,5(10),7-tetraen-17α-ol

To a solution of potassium hydroxide (0.30 g.) in methanol (25 ml.) add dl-3-methoxyestra-1,3,5(10),7-tetraen-17α-ol, acetate (0.500 g.) and warm the reaction for several minutes on the steam-bath to complete solution of all solids. Stir the reaction at room temperature for 30 minutes, then add water (150 ml.) dropwise and filter the resulting white crystalline solid to obtain 0.43 g. of the title product, M.P. 116–118°. Further purify the product by treating the solid in methylene chloride with Nuchar charcoal filtering and removing the solvent in vacuo. Crystallize the resulting oil from ether-hexane to obtain 0.240 g. of the pure title product as fluffy white needles, M.P. 123–125°;

$$\lambda_{max.}^{KBr} \ 3.10\mu$$

*Analysis.*—Calculated for $C_{19}H_{24}O_2$ (percent): C, 80.24; H, 8.51. Found (percent): C, 79.98; H, 8.79.

EXAMPLE 128 dl-7α,8α-epoxy-13-ethyl-17α-ethynyl-3-methoxygona-1,3,5(10)-trien-17β-ol

Dissolve dl - 13-ethyl-17α-ethynyl-3-methoxygona-1,3,5(10),7-tetraen-17β-ol (100 g. ) in benzene (75 ml.) then add m-chloroperbenzoic acid (0.75 g.) and stir the reaction at room temperature for 2 hours. Add 5% sodium carbonate solution, dilute with ethyl acetate then wash the organic layer with 5% sodium carbonate, water and brine and dry over sodium sulfate. Filter, remove the solvent in vacuo and crystallize the resulting oil from methanol. Filter to obtain 0.65 g. of title product. Treat the solid in methylene chloride with Nuchar charcoal, filter and replace the solvent with isopropanol by boiling. Let stand to obtain 0.51 g. of the pure title product as white flakes, M.P. 176–178°.

$$\lambda_{max.}^{KBr} \ 2.96 \text{ and } 3.13\mu$$

*Analysis.*—Calculated for $C_{22}H_{26}O_3$ (percent): C, 78.07; H, 7.74. Found (percent): C, 77.96; H, 7.90.

EXAMPLE 129 dl-estra-1,3,5(10),7-tetraene-3,17α-diol (dl-17α-dihydroequilin)

To 3 M ethereal methyl magnesium iodide solution (70 ml. ) add dl-3-methoxyestra-1,3,5(10),7-tetraen-17α-ol, acetate (3.00 g.) and under nitrogen heat the reaction with an oil-bath to 165° (bath temperature). Keep the bath temperature at 165–170° for 3 hours then cool to room temperature then below by immersion in a Dry Ice acetone bath. Carefully add ethyl acetate (150 ml.) and stir the reaction vigorously, keeping the temperature below 0° by use of the cold-bath. Add small amounts of water occasionally to speed the decomposition reaction, taking care to keep the temperature below 0°. When decomposition is complete add water (250 ml.) and solid ammonium chloride (50 g.), stir and filter the mixture through Super-Cel. Extract the filtrate with ethyl acetate, wash dry and evaporate the extract in vacuo and triturate the residue with chloroform. Filter to obtain 2.00 g. of the title product, M.P. 223–227°. Further purify the sample by treating the solid in hot tetrahydrofuran with Nuchar charcoal, filtering and replacing the solvent with isopropanol by boiling. Let stand to complete crystallization then filter to obtain 1.41 g. of pure title product, M.P. 226–228° and 231–232° (polymorphs).

$$\lambda_{max.}^{KBr} \ 3.05 \text{ and } 3.22\mu$$

*Analysis.*—Calculated for $C_{18}H_{22}O_2$ (percent): C, 79.96; H, 8.20. Found (percent): C, 79.75; H, 8.27.

EXAMPLE 130 dl-17α-ethynyl-3-methoxyestra-1,3,5(10), 8-tetraen-17β-ol

Suspend dl - 3-methoxyestra-1,3,5(10),8-tetraen-17-one (5.00 g.) in anhydrous dimethyl sulfoxide (60 ml.) and bubble purified acetylene gas through the stirred mixture for 45 minutes. Add lithium acetylide-ethylene diamine complex (2.5 g.) and continue stirring under acetylene for 45 minutes. Add another charge of lithium acetylide-ethylene diamine complex (2.0 g.) and continue stirring a further 45 minutes. Pour the reaction onto ice, filter and wash the resulting solid. Dissolve the dry solid in benzene, pass the solution through a column of Florex XXS and remove the benzene in vacuo. Crystallize the resulting oil from methanol to obtain 4.62 g. of the product in two crops. Dissolve a sample (1.00 g.) of the product in methylene chloride, treat with Nuchar charcoal and filter. Remove the solvent in vacuo and crystallize the resulting oil from isopropanol to obtain 0.66 g. of the pure title product, M.P. 152–154°.

$$\lambda_{max.}^{KBr} \ 2.9 \text{ and } 3.12\mu \ \lambda_{max.}^{EtOH} \ m\mu \ (\epsilon \ 16,900)$$

*Analysis.*—Calculated for $C_{21}H_{24}O_2$ (precent): C, 81.78; H, 7.84. Found (percent): C, 81.80; H, 7.76.

Similarly, when dl - 13-ethyl-3-methoxygona-1,3,5(10), 8 - tetraen - 17-one, d-3-cyclopentyloxyestra-1,3,5(10),8-tetraen-17-one and d-3-cyclopentyloxy-13-ethylgona-1,3,5(10),8-tetraen-17-one are treated by the above process there is obtained dl-13-ethyl-17α-ethynyl-3-methoxygona-1,3,5(10),8-tetraen-17β-ol, d-3-cyclopentyloxy-17α-ethynylestra - 1,3,5(10),8-tetraen-17β-ol and d-3-cyclopentyloxy - 13-ethyl-17α-ethynylgona-1,3,5(10),8-tetraen-17β-ol respectively.

EXAMPLE 131 dl-17α-ethynyl-3-methoxyestra-1,3,5(10),9(11)-tetraene-8α,17β-diol

Dissolve dl - 17α-ethynyl-3-methoxyestra-1,3,5(10),8-tetraen-17β-ol (2.00 g.) in benzene (70 ml.) and hexane (30 ml.), add anhydrous potassium carbonate (2.0 g.) then cool the stirred mixture with an ice-methanol bath. Add m-chloroperbenzoic acid (1.33 g.), stir and remove the cold-bath. Continue stirring at room temperature 2.5 hours then quench the reaction with 5% potassium carbonate solution. Extract the mixture with ethyl acetate, wash the extract with 5% potassium carbonate solution, water and brine then dry over anhydrous sodium sulfate. Filter, remove the solvent in vacuo and crytsallize the residue from ether to get 1.84 g. of product in two crops. Dissolve the product in tetrahydrofuran, treat the solution with Nuchar charcoal, filter and remove the solvent in vacuo. Dissolve the resulting oil in boiling benzene and let stand to form the pure title product as colorless prisms, 1.37 g., M.P. 213–215°;

$$\lambda_{max.}^{KBr} \ 3.0 \text{ and } 3.12\mu \ \lambda_{max.}^{EtOH} \ 2.58 \ m\mu \ (\epsilon \ 18,000)$$

*Analysis.*—Calculated for $C_{21}H_{24}O_3$ (percent): C, 77.75; H. 7.46. Found (percent): C, 77.70; H, 7.55.

Similarly, when dl-13-ethyl-17α-ethynyl-3-methoxygona-1,3,5(10),8-tetraen-17β-ol, d-3-cyclopentyloxy-17α-ethynylestra-1,3,5(10),8-tetaen-17β-ol and d-3-cyclopentyloxy-13-ethyl-17α-ethynylgona-1,3,5(10), 8-tetraen-17β-ol are treated by the above process there is obtained dl-13-ethyl-17α-ethynyl-3-methoxygona-1,3,5(10),9(11)-tetraene-8α,17β-diol, d-3-cyclopentyloxy-17α-ethynylestra-1,3,5(10),9(11)-tetraene-8α,17β-diol and d-3-cyclopentyloxy-13-ethyl-17α-ethynylgona-1,3,5(10), 9(11)-tetraene-8α,17β-diol respectively.

The subject matter which the applicants regard as their invention is particularly pointed out and distinctly claimed as follows:

1. A compound of the structure

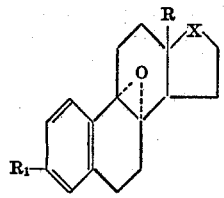

wherein
R is lower alkyl,
$R_1$ is hydroxy, lower cycloalkoxy, or lower carboxylic acyloxy, X is 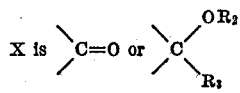

wherein
$R_2$ is hydrogen or lower carboxylic acyl
$R_3$ is hydrogen, lower alkyl, lower alkenyl or lower alkynyl, or
$R_2$ and $R_3$ taken together are —$CH_2$—$CH_2$—O—.

2. A compound of the structure

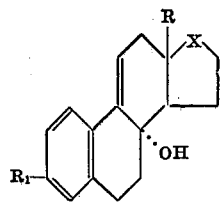

wherein
R is lower alkyl,
$R_1$ is hydroxy, lower alkyl, lower cycloalkoxy, or lower carboxylic acyloxy,
X is

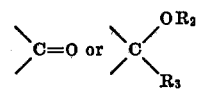

wherein
$R_2$ is hydrogen or lower carboxylic acyl
$R_3$ is hydrogen, lower alkyl, lower alkenyl or lower alkynyl, or
$R_2$ and $R_3$ taken together are —$CH_2$—$CH_2$—O—.

3. A compound of the structure

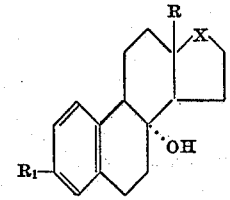

wherein
R is lower alkyl,
$R_1$ is hydroxy, lower alkoxy, lower cycloalkoxy, or lower carboxylic acyloxy,
X is

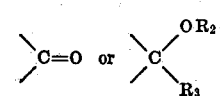

wherein
$R_2$ is hydrogen or lower carboxylic acyl
$R_3$ is hydrogen, lower alkyl, lower alkenyl or lower alkynyl, or
$R_2$ and $R_3$ taken together are —$CH_2$—$CH_2$—O—.

4. A compound of the structure

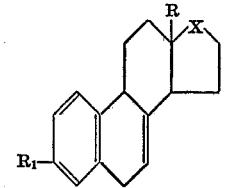

wherein
R is lower polycarbon alkyl,
$R_1$ is hydroxy, lower alkoxy, lower cycloalkoxy or lower carboxylic acyloxy,
X is

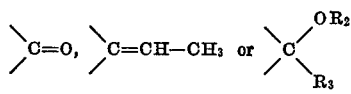

wherein
$R_2$ is hydrogen or lower carboxylic acyl,
$R_3$ is hydrogen, lower alkyl, lower alkenyl, or lower alkynyl, or
$R_2$ and $R_3$ taken together are —$CH_2$—$CH_2$—O—.

5. A compound according to claim 1, wherein the 13-lower alkyl group is methyl.

6. A compound according to claim 2 wherein the 13-lower alkyl group is methyl.

7. A compound according to claim 3 wherein the 13-lower alkyl group is methyl.

8. A compound according to claim 4 wherein the 13-lower polycarbonalkyl group is ethyl.

9. 8,9-epoxy-3-methoxy - 13 - methylgona-1,3,5(10)-trien-17-ol.

10. 3 - methoxy - 13 - methylgona-1,3,5(10),9(11)-tetraene-8,17-diol.

11. 3 - cyclopentyloxy-13-methylgona-1,3,5(10),9(11)-tetraene-8,17-diol.

12. 3-methoxy - 13 - methylgona-1,3,5(10)-triene-8,17-diol.

13. 13-ethyl-3-methoxygona-1,3,5(10),7-tetraen-17-ol.

14. 13-ethylgona-1,3,5(10),7-tetraene-3,17-diol.

15. 13-ethyl - 3 - hydroxygona-1,3,5(10),7-tetraen-17-one.

16. 3-cyclopentyloxy - 13 - ethyl-17α-ethynylgona-1,3,5(10),7-tetraen-17-ol.

17. 13-ethyl-17α-ethynyl - 3 - methoxygona-1,3,5(10),7-tetraen-17-ol.

18. The process for preparing a 13-alkylgona-1,3,5(10),7-tetraene comprising:
(a) treating a 13-alkylgona-1,3,5(10),8-tetraene having at least one hydrogen at the 7-position with about one mole of an organic peracid to form the corresponding 8,9-epoxygona-1,3,5(10)-triene;
(b) treating with an organic acid to form an 8-hydroxy-gona-1,3,5(10),9(11)-tetraene;
(c) selectively catalytically hydrogenating the 9(11)-unsaturation; and
(d) treating with a dehydrating agent to dehydrate the 7,8-position.

19. The process for preparing a 13-alkyl-8-hydroxy-1,3,5(10),9(11)-tetraene comprising treating a 13-alkyl-8,9-epoxygona-1,3,5(10)-triene with an organic acid.

20. The process for preparing a 13-alkylgona-1,3,5 (10),7-tetraene comprising treating with a dehydrating agent a 13-alkyl-8-hydroxygona-1,3,5(10)-triene having at least one hydrogen at the 7-position.

21. The process of claim 18 in which the 13-alkyl is methyl.

22. The process of claim 19 in which the 13-alkyl is methyl.

23. The process of claim 20 in which the 13-alkyl is methyl.

24. The process of claim 20 in which the 13-alkyl is ethyl.

25. 17α-ethynyl-3-methoxy - 13 - methylgona-1,3,5(10), 9(11)-tetraene-8α-17β-diol.

References Cited

UNITED STATES PATENTS 2,930,805  3/1960  Marshall _____ 260—397.4

HENRY A. FRENCH, Primary Examiner

U.S. Cl. X.R.

260—239.5, 397.4, 397.45, 397.5, 999